(12) United States Patent
Bando et al.

(10) Patent No.: US 8,250,564 B2
(45) Date of Patent: *Aug. 21, 2012

(54) IMAGE FORMING APPARATUS, PROGRAM UPDATING SYSTEM, PROGRAM UPDATING PROGRAM

(75) Inventors: Ryoji Bando, Sakai (JP); Takatoshi Mochizuki, Kobe (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 1249 days.

This patent is subject to a terminal disclaimer.

(21) Appl. No.: 11/945,281

(22) Filed: Nov. 27, 2007

(65) Prior Publication Data

US 2008/0263538 A1 Oct. 23, 2008

(30) Foreign Application Priority Data

Apr. 19, 2007 (JP) ................................. 2007-110492

(51) Int. Cl.
*G06F 9/44* (2006.01)
*G06F 3/12* (2006.01)
*G06F 15/16* (2006.01)

(52) U.S. Cl. ........ 717/171; 717/168; 717/170; 717/173; 358/1.13; 358/1.15; 709/206

(58) Field of Classification Search ........................ None
See application file for complete search history.

(56) References Cited

U.S. PATENT DOCUMENTS

| | | | | |
|---|---|---|---|---|
| 5,504,590 | A * | 4/1996 | Kawada et al. | 358/403 |
| 6,771,385 | B1 * | 8/2004 | Iizuka et al. | 358/1.15 |
| 6,915,085 | B2 * | 7/2005 | Kawaura | 399/8 |
| 7,038,798 | B2 * | 5/2006 | Kobayashi | 358/1.15 |
| 7,100,158 | B2 * | 8/2006 | Nakane et al. | 717/172 |

(Continued)

FOREIGN PATENT DOCUMENTS

JP 10-247911 9/1998

(Continued)

OTHER PUBLICATIONS

Tomas Kalibera et al., "Automated Benchmarking and Analysis Tool", [Online], Oct. 2006, pp. 1-10, [Retrieved from Internet on Apr. 27, 2012], <http://delivery.acm.org/10.1145/1200000/1190101/a5-kalibera.pdf>.*

(Continued)

*Primary Examiner* — Thuy Dao
*Assistant Examiner* — Ziaul A Chowdhury
(74) *Attorney, Agent, or Firm* — Buchanan Ingersoll & Rooney PC

(57) ABSTRACT

In order to shorten the unusable time, the multi-function peripheral (MFP) can communicate with a server storing a plurality of kinds of update programs together with update information for each of a plurality of kinds of functions, and includes a flash memory to store an execution program, a function execution portion to execute the stored execution program and execute at least one of the functions, a performance storage portion, when any of the functions is executed, to store performance information indicating execution of the function for each executed function in the flash memory, a determination portion to determine a target program from among the update programs stored in the server based on the performance information and the update information stored in the server, and an updating portion to acquire the determined target program and update the execution program stored in the flash memory with the acquired target program.

20 Claims, 18 Drawing Sheets

U.S. PATENT DOCUMENTS

| | | | |
|---|---|---|---|
| 7,334,224 B2* | 2/2008 | Haga et al. .................... | 717/168 |
| 7,372,592 B2* | 5/2008 | Murakata ..................... | 358/1.15 |
| 7,516,450 B2* | 4/2009 | Ogura ......................... | 717/168 |
| 7,613,404 B2 | 11/2009 | Takeuchi et al. | |
| 7,831,967 B2* | 11/2010 | Won et al. .................... | 717/172 |
| 7,904,549 B2* | 3/2011 | Ohta et al. .................... | 709/224 |
| 8,046,756 B2* | 10/2011 | Okutsu et al. ................. | 717/178 |
| 2003/0204841 A1* | 10/2003 | Nakane et al. ................ | 717/170 |
| 2004/0093598 A1* | 5/2004 | Haga et al. .................... | 717/173 |
| 2004/0150851 A1* | 8/2004 | Sato ............................. | 358/1.13 |
| 2004/0205140 A1* | 10/2004 | Ikeno ........................... | 709/206 |
| 2004/0218208 A1* | 11/2004 | Akiyoshi et al. ............. | 358/1.15 |
| 2004/0255288 A1* | 12/2004 | Hashimoto et al. ........... | 717/171 |
| 2004/0261074 A1* | 12/2004 | Murakata ..................... | 717/178 |
| 2005/0100353 A1* | 5/2005 | Kawaura ....................... | 399/8 |
| 2005/0129010 A1 | 6/2005 | Maeda et al. | |
| 2006/0133829 A1* | 6/2006 | Kato ............................. | 399/8 |
| 2007/0006216 A1* | 1/2007 | Nakane et al. ................ | 717/173 |
| 2007/0127066 A1* | 6/2007 | Haba ............................ | 358/1.15 |
| 2007/0220139 A1* | 9/2007 | Ohta et al. .................... | 709/224 |
| 2008/0059960 A1* | 3/2008 | Akiyoshi ...................... | 717/170 |
| 2009/0187901 A1* | 7/2009 | Kanai ........................... | 717/173 |

FOREIGN PATENT DOCUMENTS

| | | |
|---|---|---|
| JP | 2001-067228 A | 3/2001 |
| JP | 2003-216430 | 7/2003 |
| JP | 2004-318855 | 11/2004 |
| JP | 2005-157509 | 6/2005 |
| JP | 2006-092374 | 4/2006 |
| JP | 2006-107217 | 4/2006 |
| JP | 2006-344098 | 12/2006 |
| JP | 2007-034913 | 2/2007 |

OTHER PUBLICATIONS

Ronaldo Arias et al., "Mapping of Software Model to Simulation Model for Performance Requirement Verification" [Online], 2011, pp. 142-150, [Retrieved from Internet on May 8, 2012], <http://mtc-m19.sid.inpe.br/col/sid.inpe.br/mtc-m19/2011/08.02.12.49/doc/p142-arias.pdf>.*

Bansari Patel, "Distributed File Systems", [Online], Nov. 2004,pp. 1-20, [Retrieved from Internet on May 8, 2012], <http://www.cs.umsl.edu/~sanjiv/classes/cs5780/projects/dfs.pdf>.*

Kari Kangas et al., "Control for Ubiquitous Embedded Systems" [Online], 1999, pp. 10-21, [Retrieved from Internet on May 8, 2012], <http://citeseerx.ist.psu.edu/viewdoc/download?doi=10.1.1.104.9339&rep=rep1&type=pdf>.*

Shuji Ono, "How to Generate Application for Next Generation: Pretty Easy Installing Secure Applications by Click Once" Windows Developer Magazine, Jul. 1, 2006, vol. 12, No. 9, pp. 72-81, published by Shoeisha Co. Ltd., with Partial English Translation.

Notice of Ground of Rejection issued in the corresponding Japanese Patent Application No. 2007-110492 dated Feb. 2, 2010, and an English Translation thereof.

Notice of Ground of Rejection in JP 2007-110492 dated May 12, 2009, and an English Translation thereof.

Notice of Allowance issued in the corresponding Japanese Patent Application No. 2007-110492 dated Jun. 1, 2010, and an English Translation thereof.

* cited by examiner

FIG. 6

UPDATE INFORMATION 231

| | PROGRAM | CONTENT OF UPDATE | | | DEGREE OF URGENCY |
|---|---|---|---|---|---|
| | | MODULE | FUNCTION | DETAIL | |
| 220 | Ver. 1.0 | — | — | — | — |
| 221 | Ver. 1.1 | MODULE C | FUNCTION C1 | BUG CORRECTED | A |
| 222 | Ver. 1.2 | MODULE A | FUNCTION A1 | FUNCTION ADDED | B |
| 223 | Ver. 1.3 | MODULE B | FUNCTION B2 | FUNCTION MODIFIED | C |

F I G. 8

73

PERFORMANCE INFORMATION

| MODULE | FUNCTION | NUMBER OF TIMES OF USE | FREQUENCY |
|---|---|---|---|
| MODULE A | FUNCTION A1 | 10 | 10/10 |
| | FUNCTION A2 | 4 | 4/10 |
| MODULE B | FUNCTION B1 | 5 | 5/10 |
| | FUNCTION B2 | 7 | 7/10 |
| MODULE C | FUNCTION C1 | 0 | 0/10 |
| | FUNCTION C2 | 0 | 0/10 |

F I G. 9

75

| NO. | MODULE | FUNCTION | DEFECT CODE | DEFECT RANK | FREQUENCY OF OCCURRENCE |
|---|---|---|---|---|---|
| 1 | MODULE A | FUNCTION A1 | C-0001 | B | 1/10 |
| 2 | MODULE A | FUNCTION A2 | C-0005 | C | 1/4 |
| 3 | MODULE A | FUNCTION A2 | C-0011 | A | 4/4 |
| 4 | MODULE B | FUNCTION B1 | C-0002 | C | 2/5 |
| 5 | MODULE B | FUNCTION B2 | C-0011 | B | 4/7 |

FIG. 10

| NO. | MODULE | FUNCTION | DEFECT CODE | DEFECT RANK | TOTAL NUMBER OF TIMES OF OCCURRENCE | FREQUENCY OF OCCURRENCE |
|---|---|---|---|---|---|---|
| 1 | — | — | — | A | — | — |
| 2 | — | — | — | B OR HIGHER | TWICE OR MORE | 50% OR MORE |
| 3 | — | FUNCTION A2 | — | B OR HIGHER | — | — |
| 4 | — | FUNCTION B1 | C-0003 | — | — | — |

F I G. 1 1

| NO. | HISTORY OF USE | FREQUENCY OF USE | DEGREE OF URGENCY |
|---|---|---|---|
| 1 | — | — | A |
| 2 | YES | — | B |
| 3 | YES | 20% OR MORE | C |

IMAGE FORMING APPARATUS, PROGRAM UPDATING SYSTEM, PROGRAM UPDATING PROGRAM

This application is based on Japanese Patent Application No. 2007-110492 filed with Japan Patent Office on Apr. 19, 2007, the entire content of which is hereby incorporated by reference.

BACKGROUND OF THE INVENTION

1. Field of the Invention

The present invention relates to an image forming apparatus, a program updating system, and a program updating program. More particularly, the present invention relates to an image forming apparatus used by a plurality of persons, a program updating system including the image forming apparatus, and a program updating program for updating a program executed in the image forming apparatus.

2. Description of the Related Art

Generally, a multi-function peripheral (MFP) carries out a function by executing a program. The program is updated when a new function is added to the MFP or when a defect has been found in the installed program. To update the program, it is necessary to download a new program from a Web server provided by the manufacturer of the MFP, for example, to rewrite the program stored in the MFP theretofore. In some cases, it may also be necessary to reboot the MFP. As such, a certain period of time is required for updating the program stored in the MFP.

Further, while the program is being rewritten in the MFP, or while the MFP is being rebooted, the MFP is unusable. Thus, for the MFP shared by a plurality of users, the less frequency of program updating is more desirable.

Japanese Laid-Open Publication No. 2001-067228 discloses a method of downloading firmware, wherein a host personal computer (PC) possesses part or all of printer firmware, and, every time printing processing is conducted, the printer driver compares the state of the operation firmware of the printer with the firmware requested by the application in use, to download only the necessary module(s) to the printer side.

With the conventional downloading method, however, the firmware is downloaded only after the processing to be executed in the printer is determined. This means that a certain time is always necessary from determination of the processing to be executed in the printer until completion of the downloading of the firmware, resulting in a long time required before execution of the processing.

SUMMARY OF THE INVENTION

The present invention has been accomplished in view of the foregoing problems, and an object of the present invention is to provide an image forming apparatus the unusable time of which is shortened.

Another object of the present invention is to provide a program updating system, and a program updating program ensuring shortening of the unusable time of the image forming apparatus.

In order to achieve the above-described object, according to an aspect of the present invention, there is provided an image forming apparatus capable of communicating with a server storing a plurality of kinds of update programs together with update information including an updated state of each of a plurality of kinds of functions, which includes: a program storage portion to store an execution program; a function execution portion to execute the stored execution program and execute at least one of the plurality of kinds of functions; a performance storage portion, when any of the plurality of kinds of functions is executed, to store performance information regarding execution of the function for each function executed; a determination portion to determine, based on the performance information and the update information stored in the server, a target program from among the plurality of kinds of update programs stored in the server; and an updating portion to acquire the determined target program and update the execution program stored in the program storage portion with the acquired target program.

According to another aspect of the present invention, there is provided an image forming apparatus capable of communicating with a server storing a plurality of kinds of update programs together with update information including an updated state of each of a plurality of kinds of functions, which includes: a program storage portion to store an execution program; a function execution portion to read the stored execution program and execute at least one of the plurality of kinds of functions; a performance storage portion, when any of the plurality of kinds of functions is executed, to store performance information regarding execution of the function; a performance information transmission portion to transmit version information of the execution program stored in the program storage portion and the performance information to the server; a reception portion, in response to transmission of the performance information, to receive from the server a target program selected from among the plurality of kinds of update programs stored in the server; and an updating portion to update the execution program stored in the program storage portion with the received target program.

According to yet another aspect of the present invention, there is provided a program updating system including a server storing a plurality of kinds of update programs together with update information including an updated state of each of a plurality of kinds of functions, and an image forming apparatus capable of communicating with the server, wherein the image forming apparatus includes: a program storage portion to store an execution program; a function execution portion to read the stored execution program and execute at least one of the plurality of kinds of functions; a performance storage portion, when any of the plurality of kinds of functions is executed, to store performance information regarding execution of the function; a performance information transmission portion to transmit version information of the execution program stored in the program storage portion and the performance information to the server; a reception portion, in response to transmission of the performance information, to receive from the server a target program selected from among the plurality of kinds of update programs stored in the server; and an updating portion to update the execution program stored in the program storage portion with the received target program; and wherein the server includes: a determination portion to determine the target program from among the plurality of kinds of update programs based on the performance information received from the image forming apparatus and the update information; and a transmission portion to transmit the determined target program to the image forming apparatus.

According to a still further aspect of the present invention, there is provided a program updating program for an image forming apparatus capable of communicating with a server storing a plurality of kinds of update programs corresponding respectively to a plurality of kinds of functions together with update information, the image forming apparatus including a program storage portion to store an execution program, wherein the program updating program is embodied on a computer readable medium for causing the image forming apparatus to execute processing including the steps of: reading the stored execution program and executing at least one of the plurality of kinds of functions; when any of the plurality of kinds of functions is executed, storing performance information regarding execution of the function; determining, based on the performance information and the update information stored in the server, a target program from among the plurality of kinds of update programs stored in the server; and acquiring the determined target program and updating the execution program stored in the program storage portion with the acquired target program.

According to yet another aspect of the present invention, there is provided a program updating program for an image forming apparatus capable of communicating with a server storing a plurality of kinds of update programs corresponding respectively to a plurality of kinds of functions together with update information, the image forming apparatus including a program storage portion to store an execution program, wherein the program updating program is embodied on a computer readable medium for causing the image forming apparatus to execute processing including the steps of: reading the stored execution program and executing at least one of the plurality of kinds of functions; when any of the plurality of kinds of functions is executed, storing performance information regarding execution of the function; transmitting version information of the execution program stored in the program storage portion and the performance information to the server; in response to transmission of the performance information, receiving from the server a target program selected from among the plurality of kinds of update programs stored in the server; and updating the execution program stored in the program storage portion with the received target program.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 shows an example of update information.

FIG. 8 shows an example of performance information.

FIG. 9 shows an example of a defect occurrence information list.

FIG. 10 shows an example of a defect condition table.

FIG. 11 shows an example of an urgency condition table.

DESCRIPTION OF THE PREFERRED EMBODIMENTS

Figure 1:
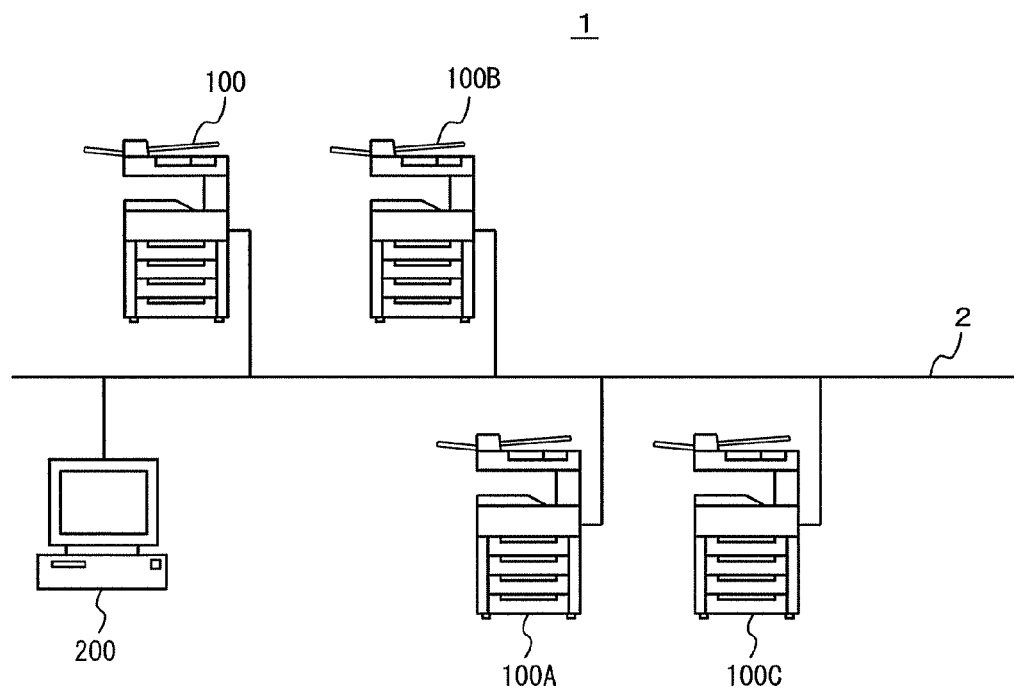
FIG. 1 is a schematic diagram of a program updating system according to an embodiment of the present invention.

Embodiments of the present invention will now be described with reference to the drawings. In the following description, like reference characters denote like parts, which have like names and functions, and therefore, detailed description thereof will not be repeated.

FIG. 1 is a schematic diagram of a program updating system according to an embodiment of the present invention. Referring to FIG. 1, a program updating system 1 includes multi-function peripherals (MFPs) 100, 100A, 100B, and 100C, and a server 200, which are connected to a network 2.

MFPs 100, 100A, 100B, and 100C are examples of an image forming apparatus. They are identical in hardware configuration and function, and thus, MFP 100 is herein explained representatively. Server 200, which is a common computer, is provided by the manufacturer of MFPs 100, 100A, 100B, and 100C, for example. Server 200 stores programs to be executed by MFPs 100, 100A, 100B, and 100C, and transmits a requested program in response to a download request from any of MFPs 100, 100A, 100B, and 100C. Every time the program is updated, server 200 stores the program at that time point in association with update information including the information changed from the program of the previous version.

Network 2 is a local area network (LAN), which may be wired or wireless. However, not restricted thereto, network 2 may be a wide area network (WAN) such as the Internet, a network using a general public line, or the like.

While program updating system 1 includes server 200 and four MFPs 100, 100A, 100B, and 100C in this example, their numbers are not limited thereto. All that is needed is that the system includes one server 200 and at least one MFP.

Figure 2:
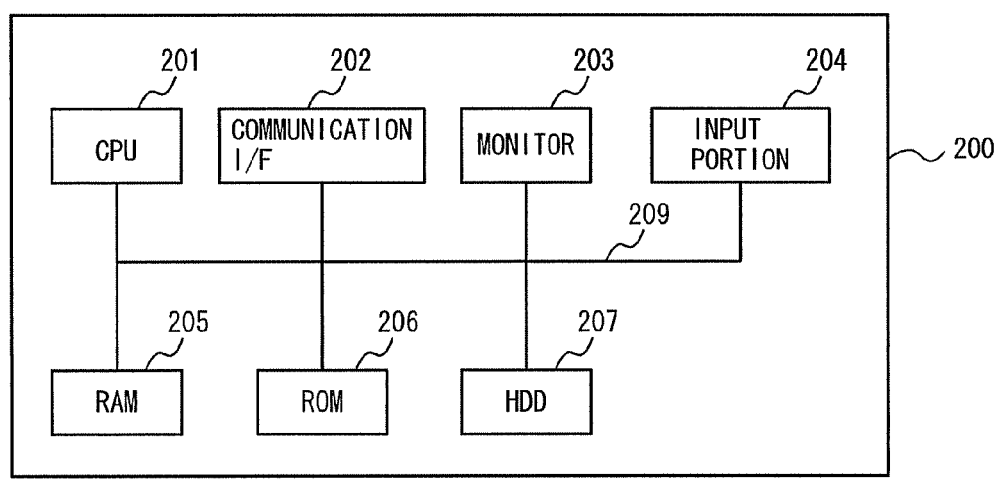
FIG. 2 shows an example of the hardware configuration of a server.

FIG. 2 shows an example of the hardware configuration of the server. Referring to FIG. 2, server 200 includes a central processing unit (CPU) 201, a random access memory (RAM) 205 used as a working area for CPU 201, a read only memory (ROM) 206 for storing a program to be executed by CPU 201, a hard disk drive (HDD) 207, a communication interface (I/F) 202 for connecting server 200 to network 2, an input portion 204 provided with a keyboard, mouse and the like, and a monitor 203 for displaying information.

Figure 3:
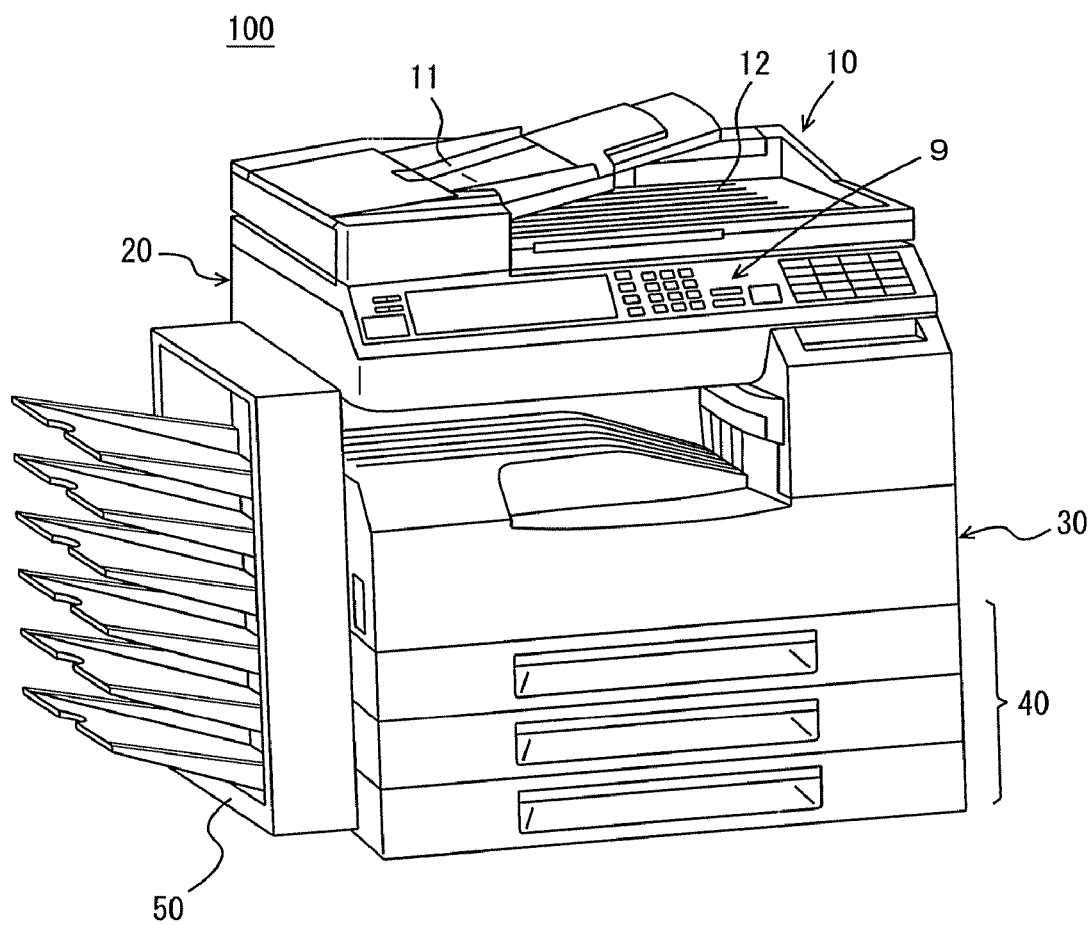
FIG. 3 is a perspective view of an MFP.

FIG. 3 is a perspective view of the MFP. Referring to FIG. 3, MFP 100 includes an automatic document feeder (ADF) 10, an image reading portion 20, an image forming portion 30, a paper feeding portion 40, and a post processing portion 50.

ADF 10 automatically delivers a plurality of originals, set on an original feed tray 11, one by one to a predetermined original reading position on a platen glass of image reading portion 20, and discharges the original having its original image read by image reading portion 20 onto an original discharge tray 12. Image reading portion 20 includes a light source that irradiates the original delivered to the original reading position with light, and a photoelectric conversion element that receives the light reflected from the original, and scans the original image in accordance with the original size. The photoelectric conversion element converts the received light into image data of electric signals, and outputs the same to image forming portion 30. Paper feeding portion 40 delivers sheets of paper stored in a paper feed tray to image forming portion 30.

Image forming portion 30 forms an image by well-known electrophotography. It performs various data processing including shading compensation on the image data input from image reading portion 20, and, based on the processed image data, forms an image on a sheet of paper fed by paper feeding portion 40.

Post processing portion 50 discharges the recording sheet on which the image was formed. Post processing portion 50 has a plurality of paper discharge trays to allow sorting of the sheets having the images formed thereon for discharge. Post processing portion 50 also has a hole-punching portion and a stapling portion to allow the discharged sheets to be punched or stapled. MFP 100 also includes an operation panel 9 on a top surface thereof, which serves as a user interface with the user.

While MFPs 100, 100A, 100B, and 100C are shown as the examples of the image forming apparatus in the present embodiment, the image forming apparatus may be a scanner, a printer, a facsimile, a personal computer, or the like, instead of the MFP.

Figure 4:
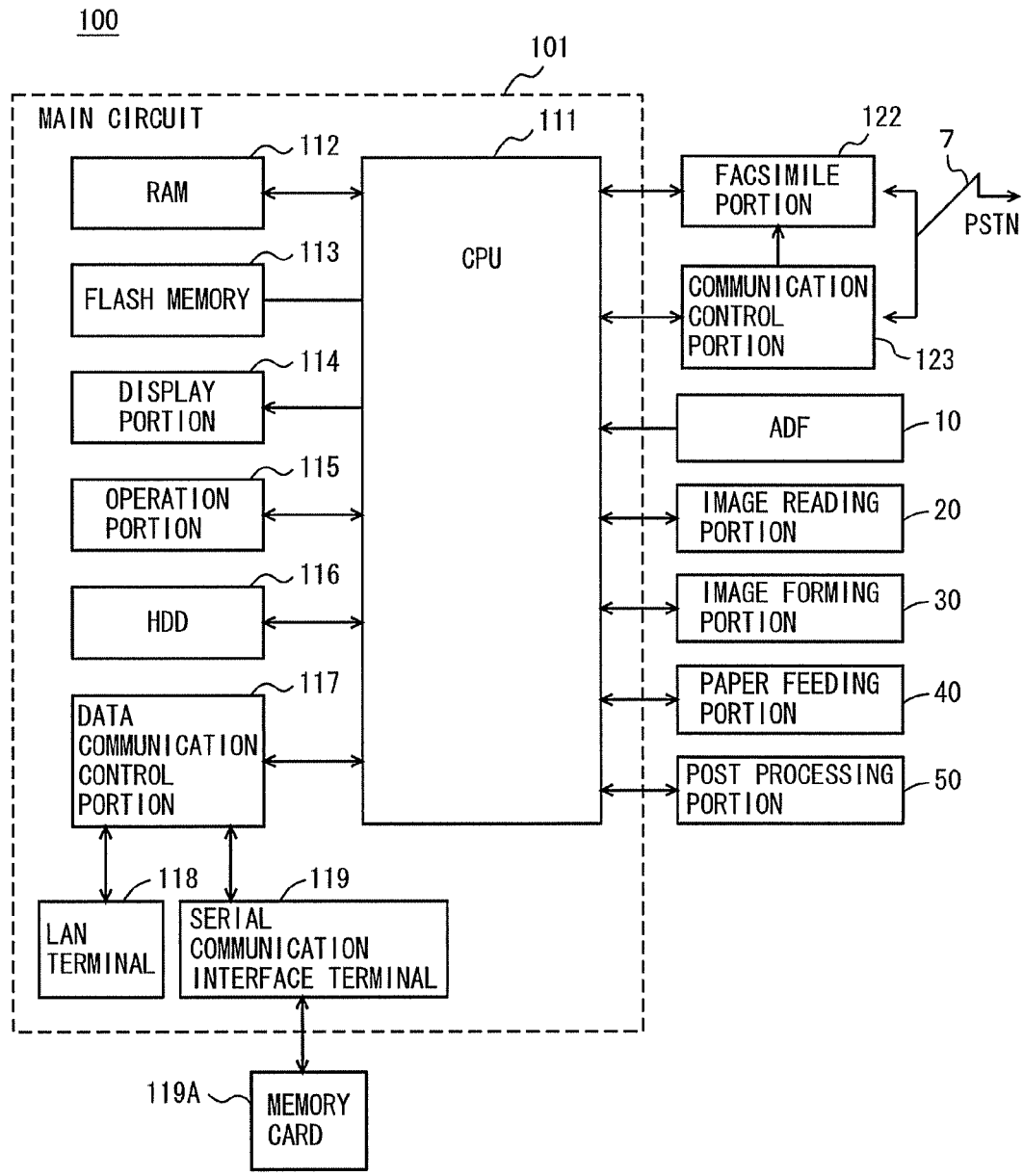
FIG. 4 is a block diagram showing an example of the circuit configuration of the MFP.

FIG. 4 is a block diagram showing an example of the circuit configuration of the MFP. Referring to FIG. 4, MFP 100 includes a main circuit 101, a facsimile portion 122, and a communication control portion 123. Main circuit 101 is connected to ADF 10, image reading portion 20, image forming portion 30, paper feeding portion 40, and post processing portion 50.

Main circuit 101 includes a CPU 111, a RAM 112 used as a working area for CPU 111, a flash memory 113 for storing a program executed by CPU 111 and the like, a display portion 114, an operation portion 115, an HDD 116 as a mass storage, and a data communication control portion 117.

CPU 111 executes an execution program stored in flash memory 113 to implement a plurality of functions. Flash memory 113 is an EEPROM (Electronically Erasable Programmable ROM).

CPU 111 is connected with display portion 114, operation portion 115, HDD 116, and data communication control portion 117, and is responsible for overall control of main circuit 101. CPU 111 is also connected with facsimile portion 122, communication control portion 123, ADF 10, image reading portion 20, image forming portion 30, paper feeding portion 40, and post processing portion 50, and is responsible for overall control of MFP 100.

Display portion 114 is a display device such as a liquid crystal display (LCD), an organic electro-luminescence display (ELD) or the like, and displays an instruction menu for the user, information about acquired image data, and others. Operation portion 115 is provided with a plurality of keys, and accepts input of data such as instructions, characters and numerical characters, according to the key operations of the user. Operation portion 115 includes a touch panel provided on display portion 114. Display portion 114 and operation portion 115 constitute operation panel 9 provided on the top surface of MFP 100.

Data communication control portion 117 includes a LAN terminal 118 that is an interface for communication according to a communication protocol such as TCP (Transmission Control Protocol) or UDP (User Datagram Protocol), and a serial communication interface terminal 119 for serial communication. Data communication control portion 117 transmits and receives data to and from an external apparatus connected to LAN terminal 118 or serial communication interface terminal 119, in accordance with an instruction from CPU 111.

When a LAN cable for connection to network 2 is connected to LAN terminal 118, data communication control portion 117 communicates with another MFP 100A, 100B, 100C, or server 200 connected via LAN terminal 118. Data communication control portion 117 also communicates with another computer connected to the Internet. CPU 111 can control data communication control portion 117 to download a program from server 200 and store the same in flash memory 113, for updating of the program. The program includes an execution program, which will be described later.

When an apparatus is connected to serial communication interface terminal 119, data communication control portion 117 communicates with the apparatus connected to serial communication interface terminal 119, which may be, e.g., a digital camera, a digital video camera, or a personal digital assistant, to input/output image data. A memory card 119A having a flash memory built therein can also be connected to serial communication interface terminal 119. CPU 111 can control data communication control portion 117 to read a program to be executed by CPU 111 from memory card 119A and store the same in flash memory 113, for updating of the program.

It is noted that the recording medium for storing the program to be executed by CPU 111 is not restricted to memory card 119A. It may be a flexible disk, a cassette tape, an optical disc (CD-ROM (Compact Disc-ROM), MO (Magnetic Optical Disc), MD (Mini Disc), DVD (Digital Versatile Disc)), an IC card (including a memory card), an optical card, or a semiconductor memory such as a masked ROM, an EPROM (Erasable Programmable ROM), an EEPROM, or the like. Alternatively, CPU 111 may download the program from server 200 and store the same in flash memory 113, or server 200 may write the program to flash memory 113, and thereafter, the program stored in flash memory 113 may be loaded to RAM 112 for execution by CPU 111. As used herein, the "program" includes, not only the program directly executable by CPU 111, but also a source program, a compressed program, an encrypted program, and others.

Communication control portion 123 is a modem for connecting CPU 111 to the public switched telephone networks (PSTN) 7. MFP 100 is assigned a telephone number in PSTN 7 in advance. When there is a call from a facsimile machine connected to PSTN 7 to the telephone number assigned to MFP 100, communication control portion 123 detects the call. Upon detection of the call, communication control portion 123 establishes the call to enable communication of facsimile portion 122.

Facsimile portion 122 is connected to PSTN 7, and transmits facsimile data to or receives facsimile data from PSTN 7.

Figure 5:
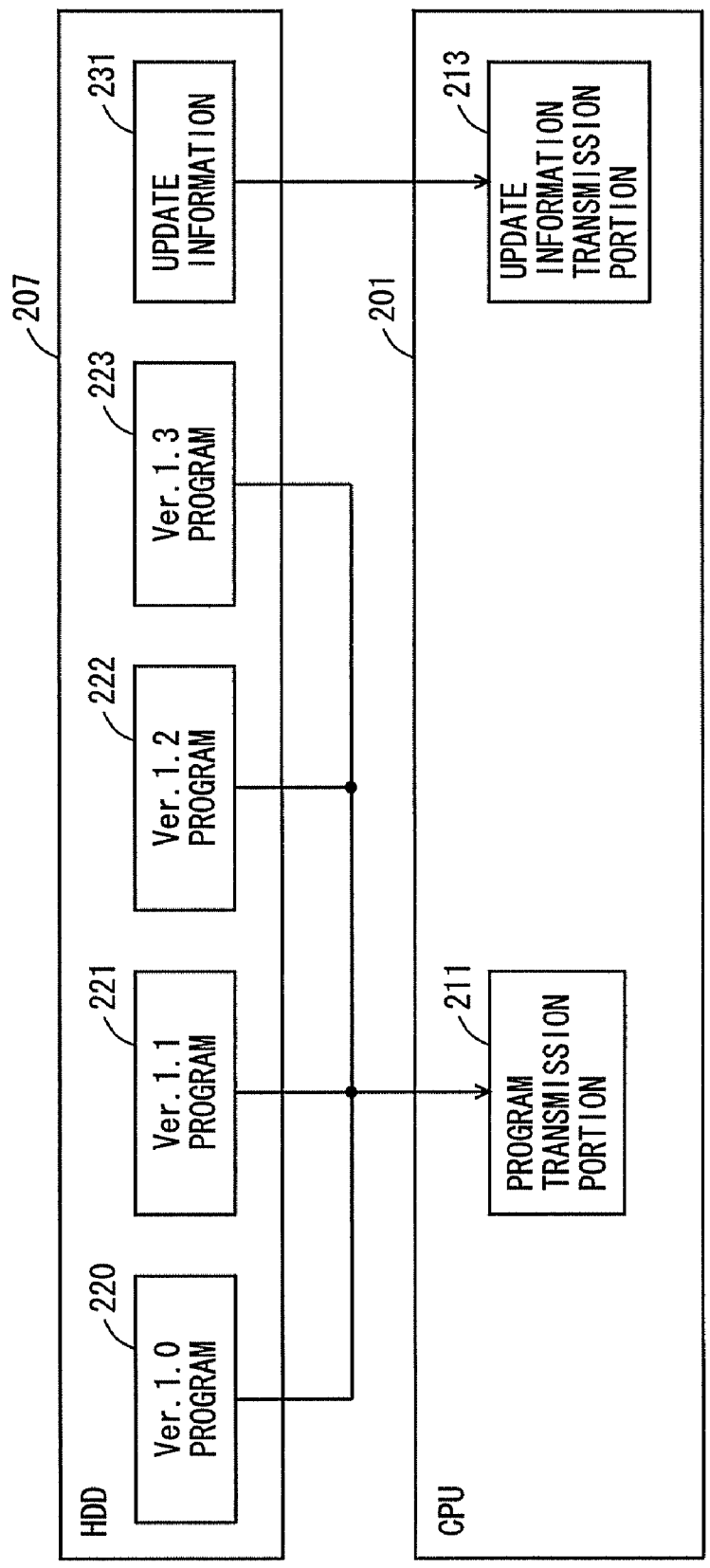
FIG. 5 is a functional block diagram showing an example of the function of a CPU provided in the server, together with data stored in an HDD.

FIG. 5 is a functional block diagram showing an example of the function of CPU 201 provided in the server, together with data stored in an HDD 207. Referring to FIG. 5, HDD 207 stores a version 1.0 program 220, a version 1.1 program 221, a version 1.2 program 222, and a version 1.3 program 223, which are to be executed by MFPs 100, 100A, 100B, and 100C, and update information 231. Update information 231 is stored in HDD 207 when programs 220-223 are stored in HDD 207.

FIG. 6 shows an example of the update information. Update information 231 defines relationship between the programs 220-223, and also defines the difference therebetween. Referring to FIG. 6, version 1.0 program 220 is the oldest, and the version 1.1, version 1.2 and version 1.3 programs are newer than the preceding one in this order. The update information defines the content of update and the degree of urgency for each program. The content of update includes the detailed content of update for each of modules and functions. The modules and functions indicate classification of a plurality of functions executable by MFP 100.

As used herein, the "module" refers to major classification of a plurality of functions executable by MFP 100, which include: the Boot function for execution of a program; the panel function for controlling input/output via operation panel 9; the data reception function for receiving data; the copying function; the scanning function; the BOX function for managing data stored in HDD 116; the FAX function for controlling transmission/reception of facsimile portion 122; the ADF function for controlling ADF 10; the finisher function for controlling post processing portion 50; the authentication function for authentication of a user; the file conversion function for converting the data file format; the image processing function for processing image data; and the network function for controlling data communication control portion 117. For example, the module of the Boot function includes the function of activating MFP 100 and the function of updating the program. The module of the panel function includes the panel accepting processing function for accepting an operation input to the panel, and the panel display function of displaying the information on the panel. The module of the data reception function includes the data reception processing function for receiving data.

As programs 220-223 are each executed by CPU 111 provided in MFP 100, the above-described functions are executed by MFP 100. The content of update defines the specific content modified, for each function executed by the portion of corresponding one of programs 220-223 that has been modified. More specifically, it shows that version 1.1 program 221 has a bug corrected in the portion for use in executing the function C1 of the module C, with respect to version 1.0 program 220. It shows that version 1.2 program 222 has a new function added to the portion for use in execution of the function A1 of the module A, with respect to version 1.1 program 221. It also shows that version 1.3 program 223 has a function modified in the portion for use in execution of the function B2 of the module B, with respect to version 1.2 program 222.

The update information further defines the degree of urgency for each program. The degree of urgency is assigned by an administrator managing the versions of programs 220-223, which may be one of the urgency degrees A, B and C. The degree of urgency indicates the degree of importance for updating to the relevant program, with A indicating the highest degree of importance and C indicating the lowest degree of importance. Here, the urgency degree A is assigned to version 1.1 program 221, the urgency degree B is assigned to version 1.2 program 222, and the urgency degree C. is assigned to version 1.3 program 223.

Returning to FIG. 5, CPU 201 includes a program transmission portion 221 that transmits one of programs 221-223, and an update information transmission portion 213 that transmits update information 231. Server 200 is capable of communicating with MFPs 100, 100A, 100B, and 100C via communication I/F 202, and when communication I/F 202 receives a transmission request of update information or a transmission request of program from any of MFPs 100, 100A, 100B, and 100C, communication I/F 202 outputs the transmission request of update information or the transmission request of program to CPU 201.

Update information transmission portion 213 reads update information 231 upon input of the transmission request of update information from communication I/F 202, and controls communication I/F 202 to transmit update information 231 to the one of MFPs 100, 100A, 100B, and 100C that transmitted the transmission request of update information. Program transmission portion 211, upon input of the transmission request of program from communication I/F 202, reads the requested program from among programs 221-223, and controls communication I/F 202 to transmit the read program to the one of MFPs 100, 100A, 100B, and 100C that transmitted the transmission request of program.

Figure 7:
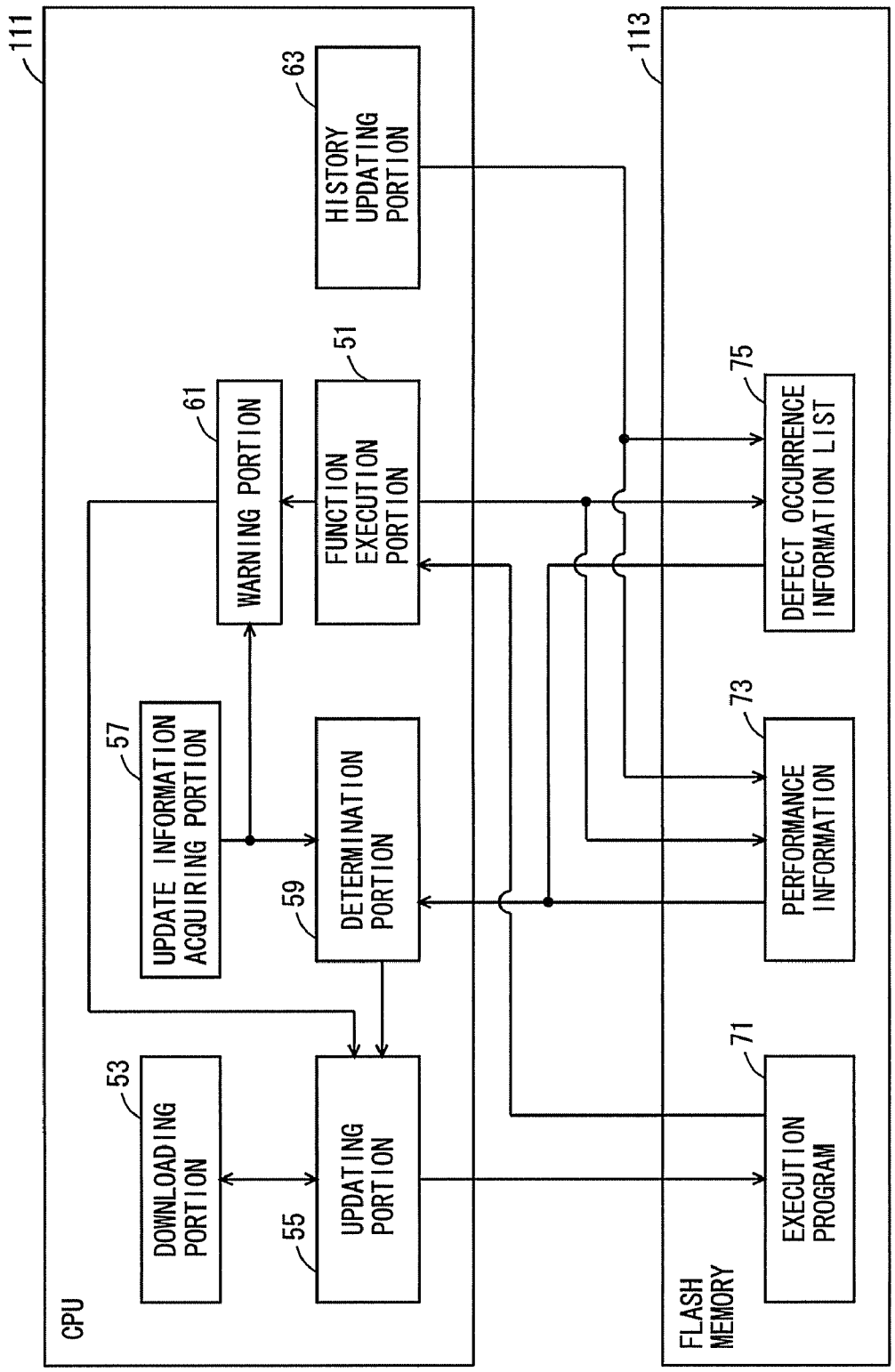
FIG. 7 is a functional block diagram showing an overview of the function of a CPU provided in the MFP, together with data stored in a flash memory.

FIG. 7 is a functional block diagram showing an overview of the function of CPU 111 provided in MFP 100, together with data stored in flash memory 113. Referring to FIG. 7, flash memory 113 stores an execution program 71, performance information 73, and a defect occurrence information list 75. CPU 111 includes: a function execution portion 51 that executes execution program 71 to execute a function; a download portion 53 to download a program from server 200; an updating portion 55 to update execution program 71 with the downloaded program; an update information acquiring portion 57 to acquire the update information from server 200; a determination portion 59 to determine whether to update execution program execution program 71; a history updating portion 63 to update performance information 73 and defect occurrence information list 75 and a warning portion 61 to issue a warning.

Function execution portion 51 loads execution program 71 stored in flash memory 113 to RAM 112, and executes execution program 71. Here, it is assumed that the version 1.0 program is stored as execution program 71. Function execution portion 51 accepts an operation input by the user at operation portion 115, and executes execution program 71 to thereby execute the function specified by the accepted operation. In the case where MFP 100 is remotely controlled by other MFP 100A, 100B, 100C, or a PC connected to network 2, the operation received by data communication control portion 117 from the apparatus as the remote control source is input to function execution portion 51 from data communication control portion 117, and function execution portion 51 executes the function specified by the input operation. Upon execution of the function(s), function execution portion 51 stores performance of each function as the performance information in flash memory 113. Further, if there occurs a defect such as an error when executing a function, function execution portion 51 stores defect occurrence information in flash memory 113.

FIG. 8 shows an example of the performance information. Referring to FIG. 8, performance information 73 stores the number of times of use and the frequency for each function. The number of times of use indicates how many times the relevant function was executed by function execution portion 51, and the frequency refers to the ratio of the number of times the function was executed by function execution portion 51 to the total number of times any functions were executed by function execution portion 51. Function execution portion 51 may execute a plurality of functions at the same time. For example, it may execute the copying function and the finisher function at the same time. In such a case, it counts the total number of times once as a whole.

FIG. 9 shows an example of the defect occurrence information list. Referring to FIG. 9, defect occurrence information list 75 stores defect occurrence information including a set of function and defect code, a defect rank, and the frequency of occurrence. The defect code is predetermined for each type of defect. The defect rank is predetermined for each set of function and defect code. While the same defects may occur for different functions, they may differ in defect rank. In FIG. 9, the defect of the defect code C-0011 that occurs upon execution of function A2 of module A is assigned the defect rank A, whereas the defect of the same defect code C-0011 that occurs upon execution of function B2 of module B is assigned the defect rank B. The frequency of occurrence refers to the ratio of the number of times of occurrence of the defect specified by the defect code to the total number of times of execution of the relevant function.

Returning to FIG. 7, update information acquiring portion 57 transmits a transmission request of update information to server 200, and receives update information 231 from server 200. Specifically, it controls data communication control portion 117 to transmit the transmission request of update information, and when data communication control portion 117 receives update information 231 from server 200, update information 231 is input from data communication control portion 117. Update information acquiring portion 57 outputs update information 231 input from data communication control portion 117 to determination portion 59 and warning portion 61.

Determination portion 59 determines whether to update execution program 71 based on the performance information stored in flash memory 113. Specifically, it specifies, based on the content of update recorded on update information 231, the function that has become the target of update for each program of the newer version than execution program 71. It then determines whether performance information 73 stored in flash memory 113 has a record that the specified function (corresponding to the updated portion) has been executed before. If performance information 73 has the record that the specified function has been executed before, it determines to update execution program 71. At this time, it determines the program of the newer version having the specified function updated, as the program for use in updating execution program 71 (hereinafter, referred to as the "target program"). It may be configured to determine to update the execution program on the condition that the performance information has the record that the specified function (corresponding to the updated portion) has been executed with the frequency exceeding a predetermined level, instead of the condition that the performance information has the record that the relevant function has been executed before.

Further, determination portion 59 determines whether to update execution program 71 based on defect occurrence information list 75. Specifically, it reads defect occurrence information list 75 stored in flash memory 113, and specifies the function (that suffered the defect) included in the defect occurrence information recorded on defect occurrence information list 75. It then determines whether the defect rank and the occurrence frequency included in the defect occurrence information match a predetermined defect condition. In the case they match, if a program in which the portion related to the specified function (that suffered the defect) has been updated is defined in update information 231, it determines to update execution program 71. At this time, it determines the program that has the portion related to the specified function (that suffered the defect) updated and that is of a newer version than the version of execution program 71 stored in flash memory 113, as the target program.

FIG. 10 shows an example of a defect condition table. The defect condition table, which defines defect conditions, is set by the administrator of MFP 100 and stored in advance in flash memory 113. Referring to FIG. 10, the defect condition table defines the defect rank for which updating is necessary. For example, the defect condition of No. 1 defines that updating is necessary if the defect rank is A. Further, the defect condition table defines a set of defect rank, the number of times of occurrence and/or the occurrence frequency for which updating is necessary. For example, the defect condition of No. 2 defines that updating is necessary if the defect rank is B or higher, the number of times of occurrence is two or more, and the occurrence frequency is 50% or more. Still further, the defect condition table defines a set of defect rank and function for which updating is necessary. For example, the defect condition of No. 3 defines that updating is necessary for function A2 if the defect rank is B or higher, that is, A or B. Furthermore, the defect condition table defines a set of function and defect code for which updating is necessary. For example, the defect condition of No. 4 defines that updating is necessary for the set of function B1 and defect code C-0003.

Returning to FIG. 7, determination portion 59 further refers to the degree of urgency in update information 231 to determine whether to update execution program 71 based on the degree of urgency. Specifically, if the urgency degree assigned to a program by update information 231 matches a predetermined urgency condition, it determines to update execution program 71 using the relevant program as the target program. Further, determination portion 59 determines whether to update execution program 71 based on the degree of urgency in update information 231 and the performance information. Specifically, if the urgency degree assigned to a program and the number of times of use or the frequency of use of the function of the relevant program match the urgency condition, it determines to update execution program 71 using the relevant program as the target program.

FIG. 11 shows an example of an urgency condition table. Referring to FIG. 11, the urgency condition table, which defines the urgency conditions, is set by the administrator of MFP 100 and stored in advance in flash memory 113. The urgency condition table includes an urgency condition defining the degree of urgency for which updating is necessary. For example, the urgency condition of No. 1 defines that the urgency degree of A requires updating. Further, the urgency condition table includes an urgency condition indicating a set of the degree of urgency and the history of use for which updating is necessary. For example, the urgency condition of No. 2 defines, as the condition requiring updating, the condition that the urgency degree is B or higher, specifically B, and that there is a history of use. The presence/absence of the history of use is determined based on the number of times of use in performance information 73 corresponding to the function of the program. If the number of times of use is one or greater, it is determined that there is a history of use. Further, the urgency condition of No. 3 defines, as the condition requiring updating, the condition that the urgency degree is C, that there is a history of use, and that the frequency of use is 20% or more. The frequency of use is determined based on the frequency of use in performance information 73 corresponding to the function of the program.

Returning to FIG. 7, when determination portion 59 determines to update execution program 71, it notifies updating portion 55 of identification information for specifying the target program. The identification information includes version information. If there are two or more programs that may be a target program, it determines the program of the latest version among them as a single program for use in updating execution program 71.

When notified of the target program from determination portion 59, updating portion 55 causes download portion 53 to download the target program from server 200. Download portion 53 controls data communication control portion 117 to transmit the identification information included in the notification input from updating portion 55 to server 200, and receives the target program transmitted from server 200. Download portion 53 outputs the received target program to updating portion 55. Upon input of the target program from download portion 53, updating portion 55 updates execution program 71 stored in flash memory 113 with the target program. Specifically, it rewrites execution program 71 with the target program received from server 200. Further, updating portion 55 reboots CPU 111 if necessary.

Updating portion 55 updates execution program 71 stored in flash memory 113 with the target program received from server 200 at a predetermined timing. The predetermined timing may be: after an input of an instruction to turn OFF the power of MFP 100, after the power of MFP 100 is turned ON, a time predetermined by a user, or the like. The predetermined time is preferably set in the time zone where MFP 100 is less likely to be used, which may be during the night, for example. Although MFP 100 is unusable during the time when the execution program is rewritten or when it is then rebooted, there is no possibility or only a very small possibility that MFP 100 is used after an input of the instruction to turn the power ON or OFF, or at a predetermined time. Thus, it is possible to cause MFP 100 to be ready immediately when the user is trying to use MFP 100. Further, it is preferable that the predetermined time is differentiated for each of MFPs 100, 100A, 100B and 100C to prevent the MFPs from updating the execution program at the same time. This avoids the undesirable event that two or more MFPs become unusable at the same time.

History updating portion 63 acquires the performance information stored in each of the other MFPs 100A, 100B and 100C, and updates performance information 73 stored in flash memory 113 with the acquired performance information. Accordingly, flash memory 113 of MFP 100 stores the performance information based on the functions executed by MFPs 100, 100A, 100B, and 100C. The states of use of MFPs 100A, 100B, and 100C can be reflected to MFP 100, which ensures that the program for use in updating the execution program is determined appropriately. Further, even at the time when a user who mainly uses one of the other MFPs 100A, 100B and 100C uses MFP 100, the program the same as the one installed in the mainly used MFP is executed in MFP 100, and therefore, the user can cause MFP 100 to execute the same function as executed in the mainly used MFP.

Further, history updating portion 63 acquires the defect occurrence information lists stored in the other MFPs 100A, 100B and 100C, and updates defect occurrence information list 75 stored in flash memory 113 with the defect occurrence information included in the acquired defect occurrence information lists. Since the states of occurrence of defects in MFPs 100A, 100B and 100C can be reflected to MFP 100, it is possible to appropriately determine the program for use in updating the execution program. Further, even if the defect that occurred in any of the other MFPs 100A, 100B and 100C has not yet occurred in MFP 100, it is possible to surely prevent occurrence of the defect in advance.

Warning portion 61 has update information 231 input from update information acquiring portion 57. Warning portion 61 determines whether it is necessary to update execution program 71 before function execution portion 51 executes a function. Here, the function to be executed by function execution portion 51 is referred to as the "target function". Warning portion 61 refers to update information 231 to determine whether there is a program for updating the portion of execution program 71 corresponding to the target function. The determination as to whether there is a program for updating the portion of execution program 71 corresponding to the target function is made according to whether there is a program in update information 231 that has the target function updated and that is of a newer version than the version of execution program 71. If there is such a program, it determines the relevant program as the target program, and determines that there is a program for updating execution program 71.

When warning portion 61 determines that there is a program (target program) for use in updating execution program 71, it issues a warning. The warning may be, for example, an output of a warning message to display portion 114, or an output of a warning sound from a speaker. When the user 6 inputs an instruction to update execution program 71 at operation portion 115, warning portion 61 accepts the update instruction, and outputs the same to updating portion 55. The update instruction includes identification information for specifying the target program for use in updating execution program 71. The identification information includes version information.

Updating portion 55, when accepting the update instruction, causes download portion 53 to download the program specified by the identification information from server 200, and updates execution program 71 with the downloaded program. If the user does not input the instruction to update the execution program through operation portion 115, warning portion 61 outputs an execution permission to function execution portion 51, without outputting the update instruction to updating portion 55. When the execution permission is input, function execution portion 51 executes the function according to the operation input previously.

There is a case where, even when server 200 stores a program having a portion updated, if the relevant portion corresponds to the function that has not been used by the user before or the function of which frequency of use is low, execution program 71 is not updated with the program. However, when the user operates MFP 100 to cause it to actually execute the function, the warning is issued to notify the user of the presence of the new, updated program. This allows the user to select at that time point whether to execute the function using the updated program, or to execute the function with the program of the current version without updating.

Figure 12:
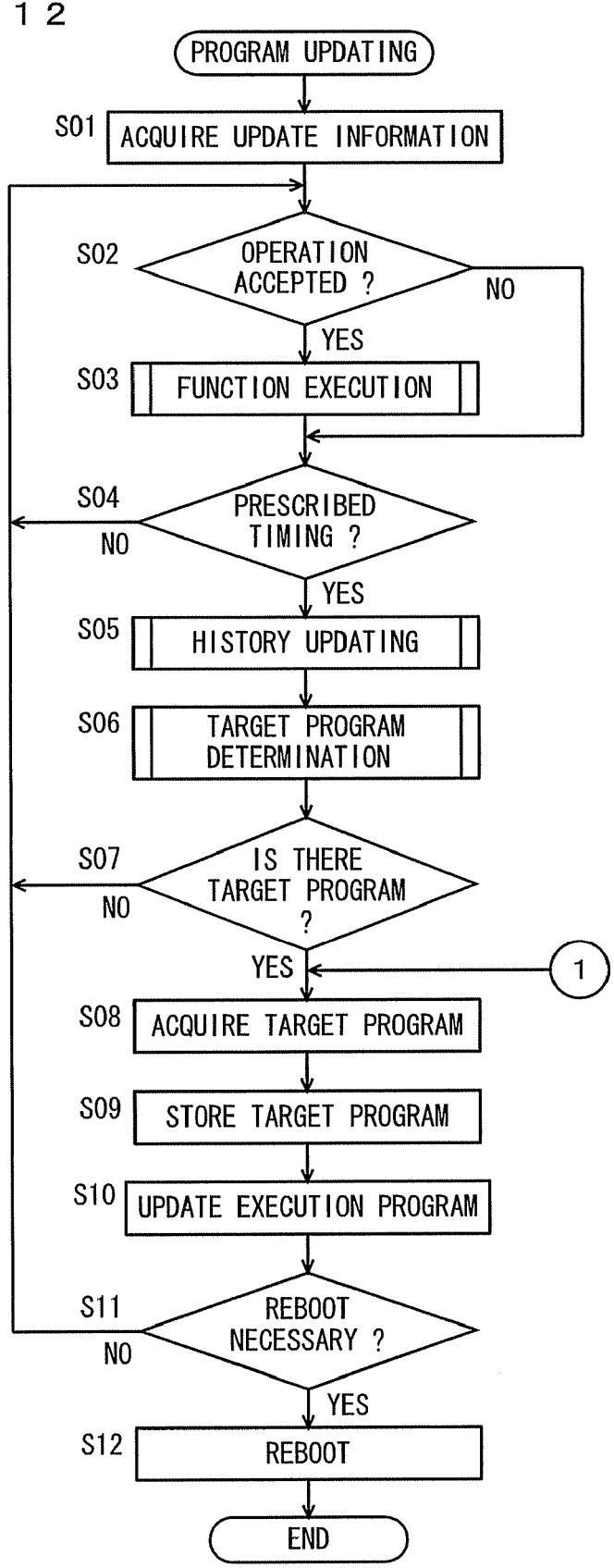
FIG. 12 is a flowchart illustrating an example of the flow of program updating processing.

FIG. 12 is a flowchart illustrating an example of the flow of program updating processing, which is executed by CPU 111 as it executes execution program 71 stored in flash memory 113. Following the power on of MFP 100, CPU 111 loads execution program 71 stored in flash memory 113 to RAM 112, and executes the boot portion of execution program 71. The boot portion of execution program 71 includes the program updating program.

Referring to FIG. 12, firstly, CPU 111 acquires update information from server 200 (step S01). It transmits a transmission request of update information to server 200, and receives update information 231 transmitted from server 200. It then determines whether an operation has been accepted (step S02). If so, the process proceeds to step S03; otherwise, the process proceeds to step S04. When the user inputs an operation at operation portion 115, the input operation is accepted from operation portion 115. Further, in the case where MFP 100 is remotely controlled by one of the other MFPs 100A, 100B, 100C or a PC connected to network 2, when data communication control portion 117 receives an operation from the apparatus of remote control source, the operation is accepted from data communication control portion 117.

In the following step S03, function execution processing is carried out to execute a function according to the operation accepted in step S02. The function execution processing will be described later in detail. In the following step S04, it is determined whether it is a prescribed timing. If so, the process proceeds to step S05; otherwise, the process returns to step S02. The prescribed timing is predetermined, which may be, e.g., after an input of an instruction to turn OFF the power of MFP 100, after the power of MFP 100 is turned ON, or a time predetermined by the user. The prescribed timing is preferably set during the time zone where MFP 100 is less likely to be used. This is because, when execution program 71 is updated or MFP 100 is rebooted in the processing described later, MFP 100 will be unusable during the relevant period.

In step S05, history updating processing is executed. The history updating processing, which will be described later in detail, is the processing of collecting the performance information and the defect occurrence information from other MFPs 100A, 100B and 100C, and updating performance information 73 and defect occurrence information list 75 stored in flash memory 113 of MFP 100.

In step S06, target program determination processing is executed. The target program determination processing, which will be described later in detail, is the processing of determining the target program for use in updating execution program 71. Since the history updating processing is executed in step S05, performance information 73 and defect occurrence information list 75 are shared among MFPs 100, 100A, 100B, and 100C. This ensures that a program of an appropriate version is determined as the target program. Further, a program of the version that addresses the defect(s) occurred in the other MFP(s) can be determined as the target program. As a result, it is possible to prevent occurrence of the defect suffered by the other MFP(s) in MFP 100.

In step S07, it is determined whether a target program has been determined by the target program determination processing. If so, the process proceeds to step S08; otherwise, the process returns to step S02. This is because it is not possible to update execution program 71 if there is no target program for use in updating the same.

In step S08, the target program is acquired from server 200. Specifically, a transmission request including the identification information specifying the target program is transmitted to server 200, and the target program transmitted from server 200 is received. The identification information includes the version of the program. The target program received from server 200 is stored in flash memory 113 (step S09), and execution program 71 is updated with the target program (step S10). Specifically, the target program is set as a new execution program 71 in place of the existing execution program 71.

In the following step S11, it is determined whether the reboot is necessary. If so, the process proceeds to step S12. Otherwise, execution program 71 updated by the target program is executed, and the process returns to step S02. In step S12, the reboot is carried out, and the process is terminated.

Figure 13:
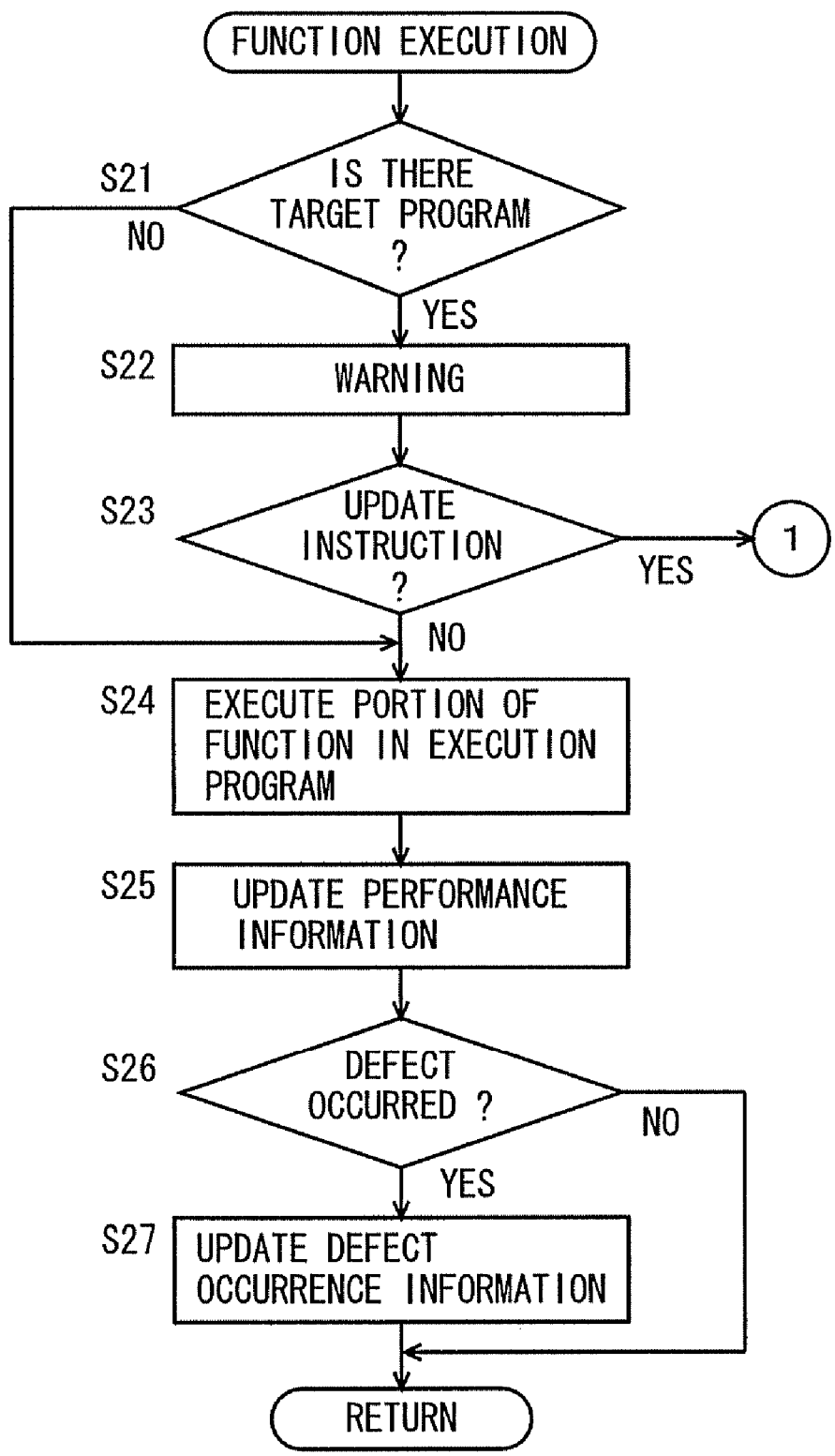
FIG. 13 is a flowchart illustrating an example of the flow of function execution processing.

FIG. 13 is a flowchart illustrating an example of the flow of the function execution processing, which is executed in step S03 of the program updating processing shown in FIG. 12. Referring to FIG. 13, it is determined whether there is a target program for use in updating execution program 71 (step S21). That the target program is present means that the portion in execution program 71 related to the function (hereinafter, referred to the "target function") corresponding to the accepted operation has not been updated, whereas that there is no target program means that the portion in execution program 71 related to the target function has already been updated. Specifically, update information 231 is referred to for determination as to whether there is a program that is of a newer version than execution program 71 and in which the portion related to the function (target function) corresponding to the operation accepted in step S02 of FIG. 12 is updated. If there is such a program, the program is determined to be the target program. If there is the target program, the process proceeds to step S22; otherwise, the process proceeds to step S24. In step S22, a warning is output. Here, a message indicating that there is a program for updating the function and inquiring whether to update the program is displayed on display portion 114. Alternatively, it is possible to sound a buzzer.

In step S23, it is determined whether an update instruction from the user has been accepted. When a key provided in operation portion 115 for inputting an update instruction is depressed by the user, the update instruction is accepted from operation portion 115. When the update instruction is accepted, the process proceeds to step S08 in the program updating processing shown in FIG. 12. If the update instruction is not accepted, the process proceeds to step S24. When the update instruction is accepted, the target program the presence of which has been confirmed in step S21 is received from server 200, and execution program 71 is updated with the program received from the server. Thus, when the user inputs an operation, the function corresponding to the operation is executed based on execution program 71 newly updated. Accordingly, it is possible to update execution program 71 to a newer version at an appropriate timing. Further, it is possible to prevent occurrence of a defect.

In step S24, the portion of execution program 71 for the function corresponding to the operation is executed. CPU 111 specifies any of a plurality of functions based on the operation accepted in step S02 of the program updating processing shown in FIG. 12, and executes the portion of the execution program corresponding to the specified function. As such, the function corresponding to the operation is executed based on execution program 71. The function may be any of a plurality of functions classified by the modules described above, which include: the Boot function, panel function, data reception function, copying function, scanning function, BOX function, FAX function, ADF function, finisher function, authentication function, file conversion function, image processing function, and network function. The operation may specify a plurality of functions, in which case the portions of the execution program corresponding to the respective ones of the specified functions are executed.

In the following step S25, performance information 73 stored in flash memory 113 is updated based on the result of execution of the function in step S24. Specifically, the number of times of use of the executed function is incremented by 1 and the frequency is also updated in performance information 73. It is then determined whether there has occurred a defect (step S26). If a defect has occurred as a result of execution of the function, the process proceeds to step S27; otherwise, the process returns to the program updating processing, with step S27 being skipped. In step S27, defect occurrence information list 75 stored in flash memory 113 is updated based on the result of execution of the function in step S24. Specifically, the occurrence frequency is updated for the defect occurrence information that includes the information specifying the executed function and the defect code corresponding to the defect that occurred.

Figure 14:
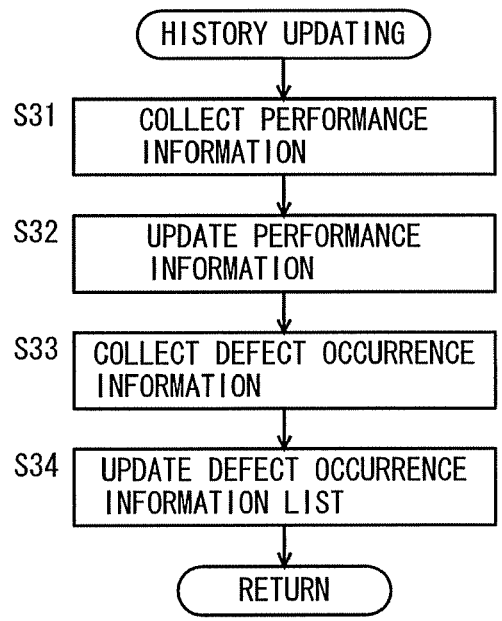
FIG. 14 is a flowchart illustrating an example of the flow of history updating processing.

FIG. 14 is a flowchart illustrating an example of the flow of the history updating processing, which is executed in step S05 of the program updating processing shown in FIG. 12. Referring to FIG. 14, the performance information is collected from other MFPs 100A, 100B and 100C (step S31). Specifically, a transmission request of performance information is transmitted to each of the other MFPs 100A, 100B and 100C, and the performance information is received from each of them. Performance information 73 stored in flash memory 113 is updated with the received performance information (step S32). As such, the performance information based on the functions executed in MFPs 100, 100A, 100B, and 100C is stored in flash memory 113 of MFP 100.

Next, the defect occurrence information is collected from other MFPs 100A, 100B, and 100C (step S33). Specifically, a transmission request of the defect occurrence information list is transmitted to each of the other MFPs 100A, 100B, and 100C, and the lists are received from each of them. Then, defect occurrence information list 75 stored in flash memory 113 is updated with the defect occurrence information included in the received defect occurrence information lists (step S34). This enables the defect occurrence information of the defect that occurred in any of the other MFPs 100A, 100B and 100C to be stored in MFP 100. Accordingly, it is possible to update execution program 71 with the program of a newer version that can prevent occurrence of the defect.

Figure 15:
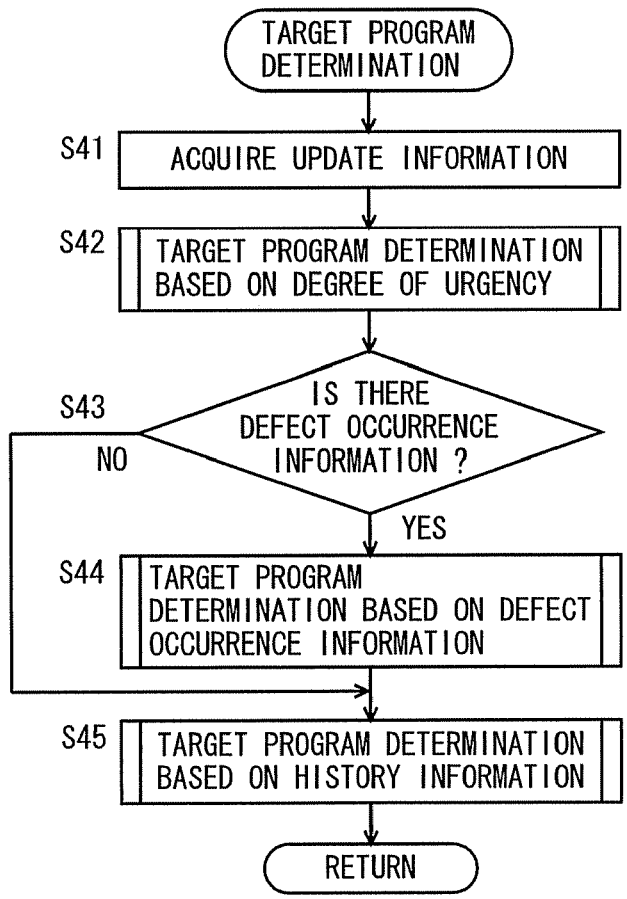
FIG. 15 shows an example of the flow of target program determination processing.

FIG. 15 is a flowchart illustrating an example of the flow of the target program determination processing, which is executed in step S06 of the program updating processing shown in FIG. 12. Referring to FIG. 15, firstly, the update information is acquired from server 200 (step S41). Specifically, a transmission request of update information is transmitted to server 200, and the update information transmitted from server 200 is received. Then, target program determination processing based on the degree of urgency is executed.

Next, it is determined whether there is defect occurrence information (step S43). Specifically, it is determined whether defect occurrence information is stored in defect occurrence information list 75. If so, the process proceeds to step S44; otherwise, the process proceeds to step S45. In step S44, target program determination processing based on the defect occurrence information is executed, and the process proceeds to step S45. In step S45, target program determination processing based on history information is executed, and the process returns to the program updating processing.

Figure 16:
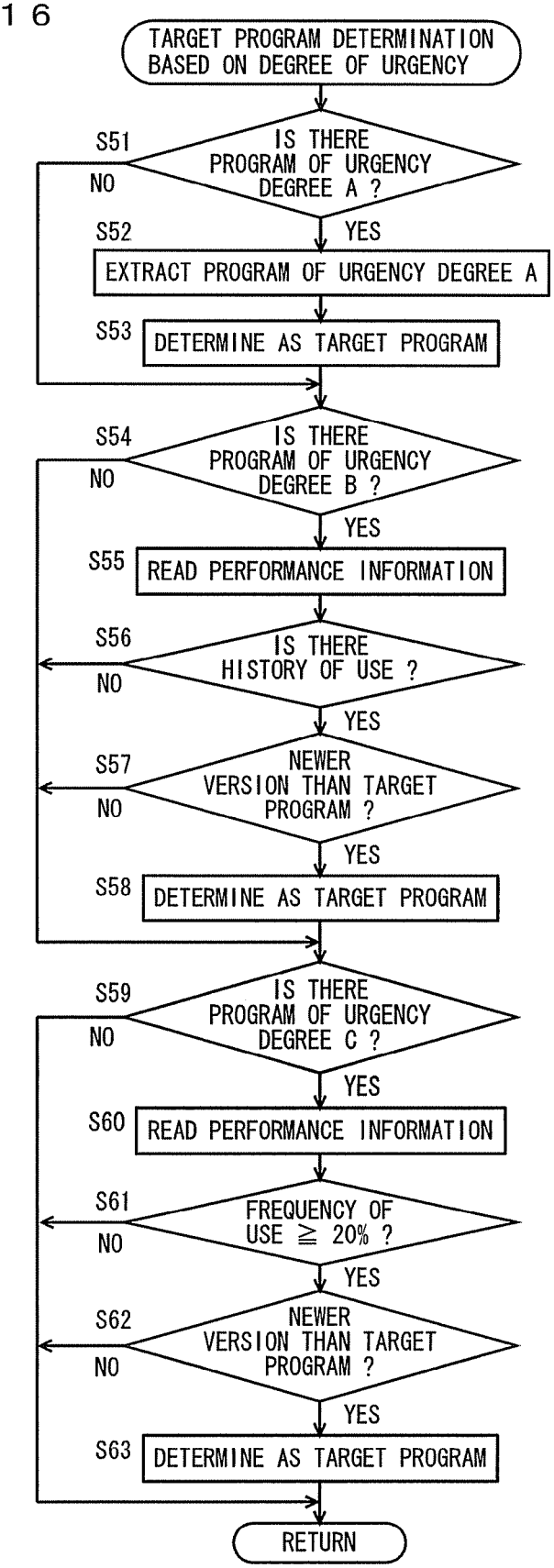
FIG. 16 is a flowchart illustrating an example of the flow of target program determination processing based on the degree of urgency.

FIG. 16 is a flowchart illustrating an example of the flow of the target program determination processing based on the degree of urgency, which is executed in step S42 in FIG. 15. Referring to FIG. 16, CPU 111 refers to the update information to determine whether there is a program assigned the urgency degree A (step S51). If there is a program of urgency degree A, the process proceeds to step S52; otherwise, the process proceeds to step S54. In step S52, the program of urgency degree A is extracted. If there are two or more programs assigned the urgency degree A, those programs are all extracted. Among the extracted programs, the program of the latest version is determined to be a program for use as the target program (step S53), and the process proceeds to step S54. In the case where the update information shown in FIG. 6 is received from server 200, the version 1.1 program is determined as the target program.

In step S54, it is determined whether there is a program assigned the urgency degree B. If so, the process proceeds to step S55; otherwise, the process proceeds to step S59. In step S55, performance information 73 is read from flash memory 113. Then, it is determined whether there is a history of use for the function corresponding to the updated portion in the program of urgency degree B the presence of which was confirmed in step S54 (step S56). If the function has been executed at least once before, it is determined that there is a history of use. If there is a history of use, the process proceeds to step S57; otherwise, the process proceeds to step S59.

In the case where the update information shown in FIG. 6 is received from server 200, the program of urgency degree B is the version 1.2 program, and the function corresponding to the updated portion in that program is function A1 of module A. Next, referring to performance information 73 shown in FIG. 8, function A1 of module A has been used ten times before, so that it is determined that there is a history of use.

In step S57, it is determined whether the program of urgency degree B the presence of which was confirmed in step S54, i.e., the version 1.2 program in this example, is of a newer version than the program that has been set as the target program at that time. If it is of the newer version, the process proceeds to step S58; otherwise, the process proceeds to step S59, with step S58 being skipped. In step S58, the program of urgency degree B the presence of which was confirmed in step S54 is determined to be the program for use as the target program, in place of the program that was set to be the target program in step S53. This is for the purpose of setting the program of a newer version as the target program. If a program for use as the target program has not been determined in step S53, the program of urgency degree B the presence of which was confirmed in step S54 is determined to be the program for use as the target program.

In step S59, it is determined whether there is a program assigned the urgency degree C. If so, the process proceeds to step S60; otherwise, the process returns to the target program determination processing. In step S60, performance information 73 is read from flash memory 113. Then, it is determined whether the function corresponding to the updated portion in the program of urgency degree C., the presence of which was confirmed in step S59, has been used with the frequency of use of 20% or more (step S61). If the frequency of use is 20% or more, the process proceeds to step S62; otherwise, the process returns to the target program determination processing.

When the update information shown in FIG. 6 is received from server 200, the program of urgency degree C. is the version 1.3 program, and the function corresponding to the updated portion in the program is function B2 of module B. Next, referring to performance information 73 shown in FIG. 8, the frequency of use of function B2 of module B is 70%. In this case, the process proceeds to step S62.

In step S62, it is determined whether the program of urgency degree C. the presence of which was confirmed in step S59, i.e., the version 1.3 program in this example, is of a newer version than the program that has been set as the target program at that time. If so, the process proceeds to step S63; otherwise, the process returns to the target program determination processing. In step S63, the program of urgency degree C. the presence of which was confirmed in step S59 is determined to be the program for use as the target program in place of the program that was set as the target program in step S53 or S58. This is for the purpose of setting a program of a newer version as the target program. If no program for use as the target program has been determined in step S53 or S58, the program of urgency degree C. the presence of which was confirmed in step S59 is determined to be the program for use as the target program.

Figure 17:
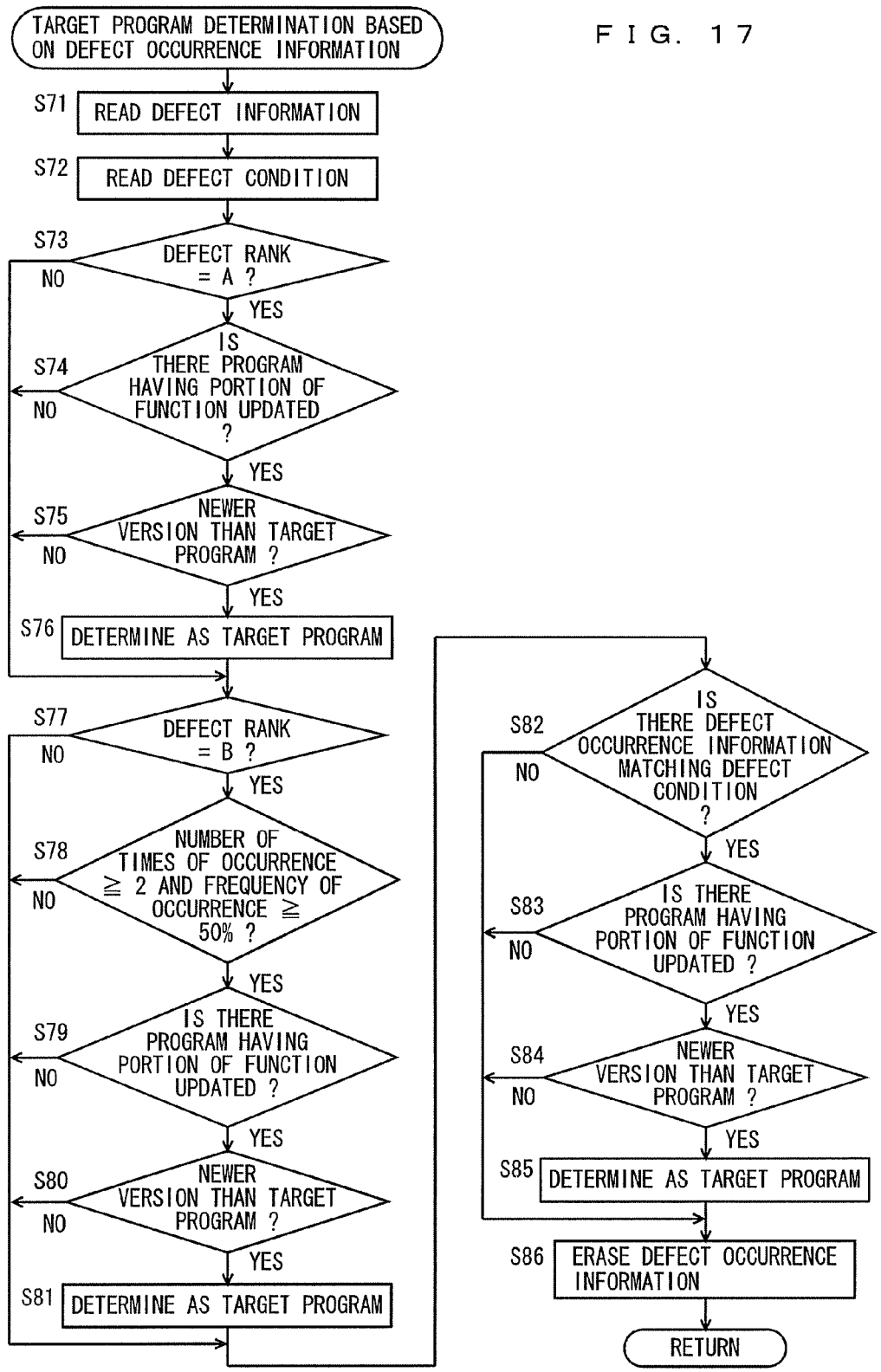
FIG. 17 is a flowchart illustrating an example of the flow of target program determination processing based on defect occurrence information.

FIG. 17 is a flowchart illustrating an example of the flow of the target program determination processing based on the defect occurrence information, which is executed in step S44 in FIG. 15. Referring to FIG. 17, CPU 111 reads the defect occurrence information from defect occurrence information list 75 stored in flash memory 113 (step S71), and reads the defect conditions (step S72). Here, it is assumed that the defect occurrence information included in defect occurrence information list 75 shown in FIG. 9 and the defect conditions shown in FIG. 10 are read. In the following steps, the defect occurrence information matching the defect conditions are extracted to determine a program for use as the target program.

In step S73, it is determined whether there is any defect occurrence information assigned the defect rank A. If so, the process proceeds to step S74; otherwise, the process proceeds to step S77. In step S74, it is determined whether a program having a portion corresponding to the function included in the defect occurrence information of defect rank A updated is present in the update information. If there is such a program, the process proceeds to step S75; otherwise, the process proceeds to step S77. In the defect occurrence information list shown in FIG. 9, the defect occurrence information of No. 3 is assigned the defect rank A, and the function is the function A2 of module A. In the case where the update information shown in FIG. 6 is received from server 200, there is no program having its updated portion corresponding to function A2 of module A. Thus, in this case, the process proceeds to step S77.

In step S75, it is determined whether the program having the portion corresponding to the function included in the defect occurrence information of update rank A updated, the presence of which was confirmed in step S74, is of a newer version than the program that has been set as the target program at that time. If so, the process proceeds to step S76; otherwise, the process proceeds to step S77, with step S76 being skipped. In step S76, the program in which the portion corresponding to the function included in the defect occurrence information assigned the defect rank A is updated is determined to be the program for use as the target program, in place of the program that has been set as the target program theretofore. This is for the purpose of setting a program of a newer version as the target program.

In step S77, it is determined whether there is any defect occurrence information assigned the defect rank B. If so, the process proceeds to step S78; otherwise, the process proceeds to step S82. In step S78, it is determined whether the function included in the defect occurrence information assigned the defect rank B has occurred two or more times before and its occurrence frequency is 50% or more. If this condition is satisfied, the process proceeds to step S79; otherwise, the process proceeds to step S82.

In step S79, it is determined whether there is a program having its updated portion corresponding to the defect occurrence information assigned the defect rank B in the update information. If there is such a program, the process proceeds to step S80; otherwise, the process proceeds to step S82. In the defect occurrence information list shown in FIG. 9, the defect occurrence information of No. 1 and No. 5 are assigned the defect rank B. For the defect occurrence information of No. 1, the number of times of occurrence is one, and the occurrence frequency is 10%, thus unsatisfying the condition. On the other hand, for the defect occurrence information of No. 5, the number of times of occurrence is four, and the occurrence frequency is 57%, thus satisfying the condition. The function of the defect occurrence information of No. 5 is function B2 of module B. Here, referring to the update information shown in FIG. 6, the program having its portion corresponding to function B2 of module B updated is the version 1.3 program. Thus, in this case, the version 1.3 program is selected, and the process proceeds to step S80.

In step S80, it is determined whether the program having its portion corresponding to the function included in the defect occurrence information of defect rank B updated, the presence of which was confirmed in step S79, i.e., the version 1.3 program in this example, is of a newer version than the program that has been set as the target program at that time. If so, the process proceeds to step S81; otherwise, the process proceeds to step S82, with step S81 being skipped. Then, the program in which the portion corresponding to the function included in the defect occurrence information assigned the defect rank B is updated is determined to be the program for use as the target program, in place of the program that has been set as the target program theretofore, for the purpose of setting a program of a newer version as the target program.

In step S82, it is determined whether there is any defect occurrence information matching the other defect conditions. If so, the relevant defect occurrence information is extracted, and the process proceeds to step S83. Otherwise, the process proceeds to step S86. In step S83, it is determined whether a program having a portion corresponding to the function included in the extracted defect occurrence information updated is included in update information 231. If so, the process proceeds to step S84; otherwise, the process proceeds to step S86. In the defect condition table shown in FIG. 10, the remaining defect conditions are of No. 3 and No. 4. The defect condition of No. 3 requires that the function is A2 and the defect rank is B or higher. The defect condition of No. 4 requires that the function is B1 and the defect code is C-0003. In defect occurrence information list 75 shown in FIG. 9, the defect occurrence information matching the defect condition of No. 3 is the defect occurrence information of No. 3, while there is no defect occurrence information matching the defect condition of No. 4. Thus, the defect occurrence information of No. 3 is extracted. The function included in the defect occurrence information of No. 3 is function A2. There is no program having its updated portion corresponding to function A2 in update information 231. Thus, in this case, the process proceeds to step S86.

In step S84, it is determined whether the version of the program the presence of which was confirmed in step S83 is of a version newer than that of the program that has been set as the target program at that time. If so, the process proceeds to step S85; otherwise, the process proceeds to step S86, with step S85 being skipped. In step S85, the program the presence of which was confirmed in step S83 is determined to be the program for use as the target program, in place of the program that has been set as the target program theretofore. This is for the purpose of setting a program of a newer version as the target program.

In step S86, the defect occurrence information is erased, and the process returns to the target program determination processing. This is because, since the processing of determining the program for use in updating the execution program based on the defect occurrence information has been completed, even if the above-described processing is executed using the same defect occurrence information, the result would be the same.

Figure 18:
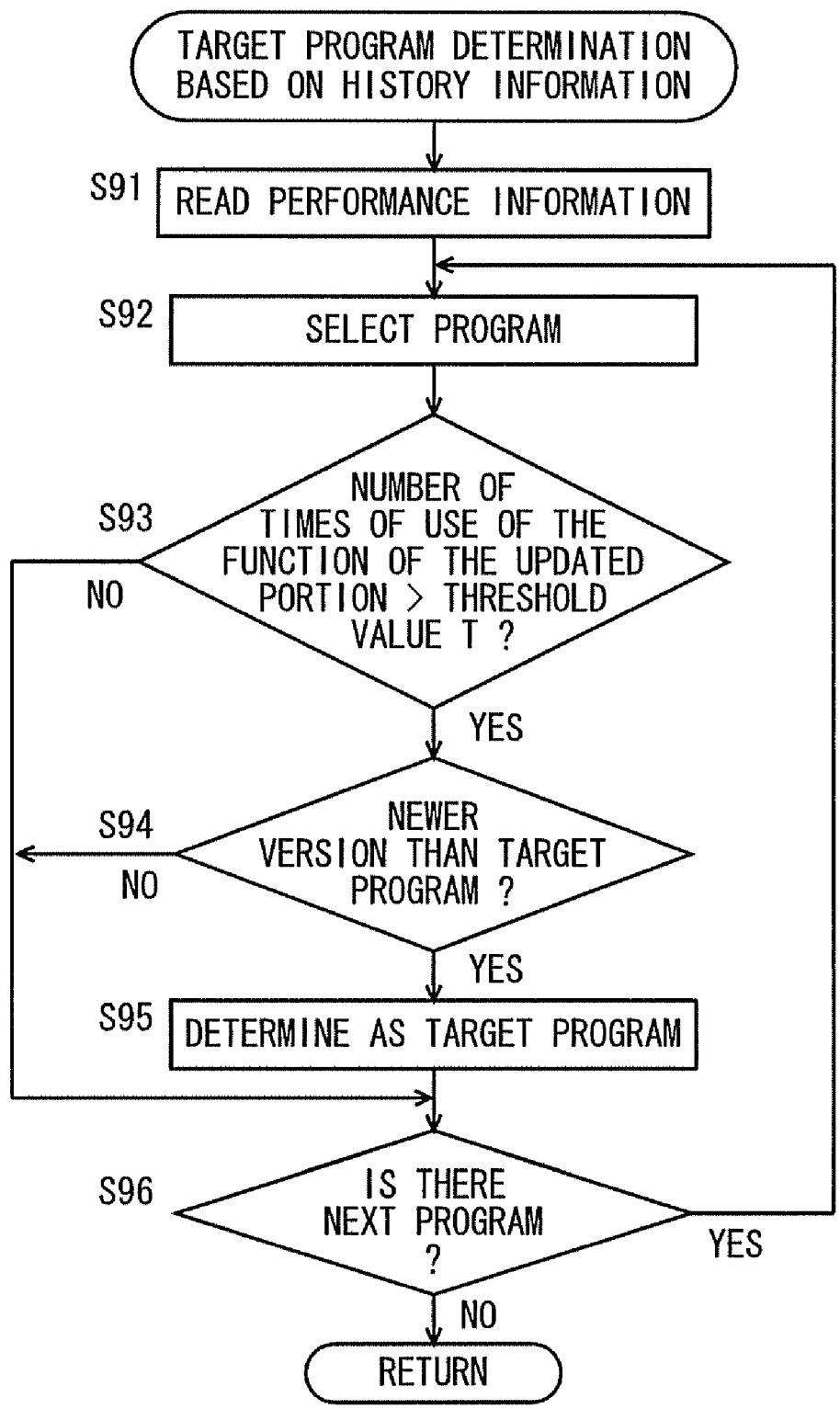
FIG. 18 is a flowchart illustrating an example of the flow of target program determination processing based on history information.

FIG. 18 is a flowchart illustrating an example of the flow of the target program determination processing based on the history information, which is executed in step S45 in FIG. 15. Referring to FIG. 18, the performance information stored in flash memory 113 is read (step S91). Then, one program is selected from among the programs defined in update information 231 as a target of processing (step S92), and it is determined whether the number of times of use of the function corresponding to the updated portion of the program as the processing target exceeds a threshold value T (step S93). If the number of times of use exceeds the threshold value T, the process proceeds to step S94; otherwise, the process proceeds to step S96. The threshold value T is set in advance by the administrator of MFP 100 or by the manufacturer. For example, when the version 1.1 program in the update information shown in FIG. 6 is set as the processing target, the function corresponding to the updated portion is function C1 of module C. Here, referring to the performance information shown in FIG. 8, the number of times of use of function C1 of module C is zero. In this case, the process proceeds to step S96.

In step S94, it is determined whether the version of the program as the processing target is newer than the version of the program that has been set as the target program at that time. If so, the process proceeds to step S95; otherwise, the process proceeds to step S96. In step S95, the program as the processing target is determined to be the program for use as the target program, in place of the one that has been set as the target program theretofore, for the purpose of setting a program of a newer version as the target program.

In step S96, it is determined whether there is a program that is to be a next target of processing. If so, the process returns to step S92; otherwise, the process returns to the target program determination processing.

As described above, MFP 100 according to the present embodiment executes execution program 71 stored in flash memory 113, and if at least one of a plurality of kinds of functions is executed, it updates performance information 73 indicating that the function has been executed, for each of the executed function. Then, it determines the target program from among the plurality of programs 220-223 stored in server 200, based on performance information 73 as well as update information 231 stored in server 200, downloads the target program, and then updates execution program 71 with the target program. As such, the execution program is not necessarily updated with the program of the latest version among the plurality of programs 220-223 stored in server 200. Rather, the execution program is updated in the limited cases, including the case where the portion corresponding to the function that has been executed before is updated, the case where the portion corresponding to the function that suffered a defect is updated, and the case where the program having its urgency degree set high is stored in server 200. This reduces the number of times of updating of the execution program.

Further, even in the case where execution program 71 has not been updated despite the fact that the program of a newer version is stored in server 200, a warning is output when an instruction to execute the function that can be updated by the program of the relevant version is accepted. This allows execution program 71 to be updated upon issuance of the instruction to execute the function.

Furthermore, execution program 71 is updated at a prescribed timing. This ensures that the execution program is updated during the time zone where MFP 100 is less likely to be used.

Still further, the performance information and the defect occurrence information are collected from other MFPs 100A, 100B and 100C, and the performance information and the defect occurrence information stored in the own apparatus are updated based thereon. This ensures that the program for updating can be determined reflecting the use histories of other MFPs 100A, 100B and 100C, and the defects that occurred in the other MFPs can be prevented from occurring in the own apparatus.

<Modification>

In the embodiment described above, MFPs 100, 100A, 100B, and 100C determine whether to update execution program 71. In this modification, it is configured such that server 200 determines whether to update execution program 71 stored in each of MFPs 100, 100A, 100B, and 100C.

Figure 19:
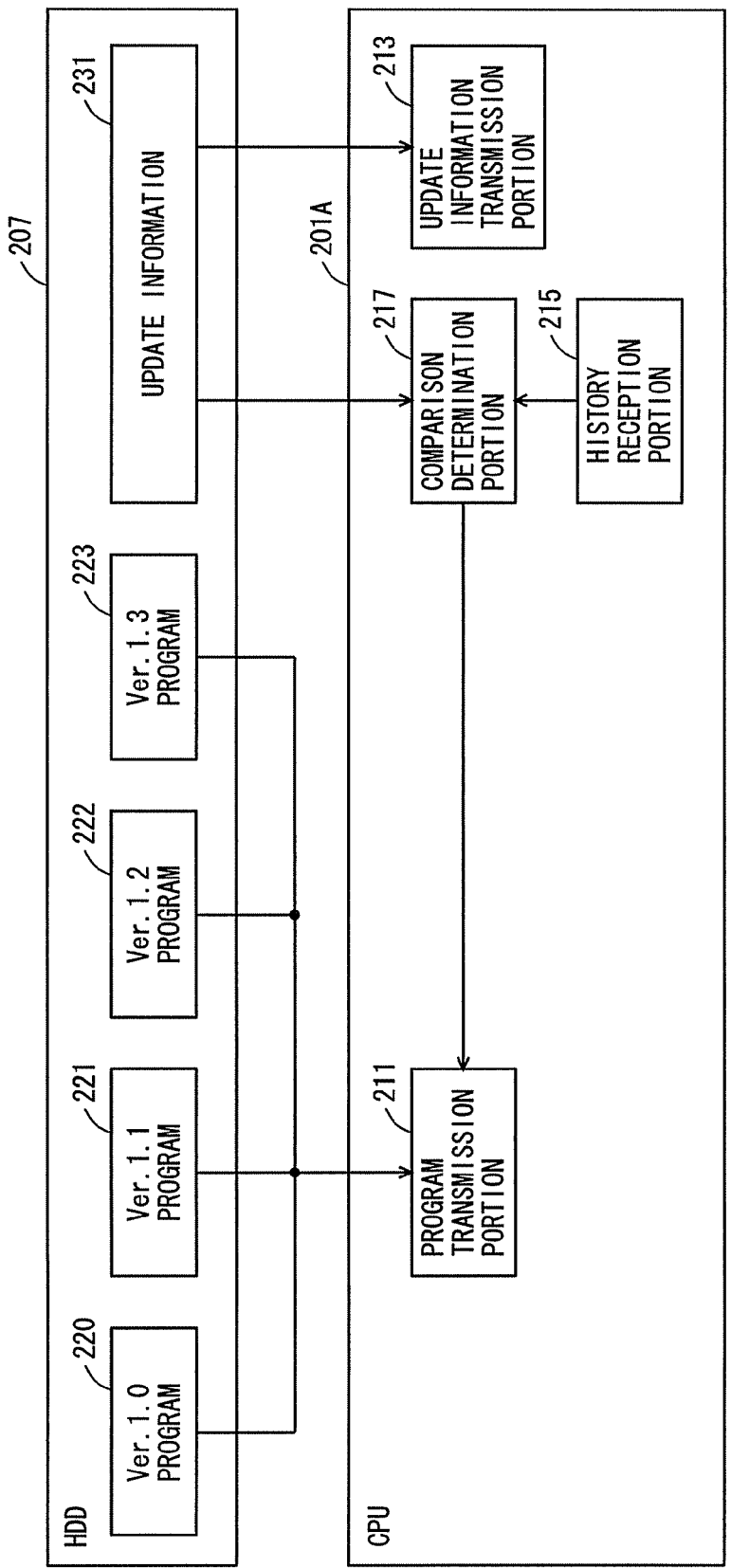
FIG. 19 is a functional block diagram showing an example of the function of a CPU provided in a server in a modification, together with data stored in an HDD.

FIG. 19 is a functional block diagram showing an example of the function of a CPU 201A provided in the server in the modification, together with data stored in HDD 207. Referring to FIG. 19, the functional block diagram of the modification differs from that shown in FIG. 5 in that a history reception portion 215 and a comparison determination portion 217 are added. History reception portion 215 receives a history from any of MFPs 100, 100A, 100B, and 100C. Here, it is assumed that the history is received from MFP 100. The history includes performance information 73, defect occurrence information list 75, and the version of execution program 71 in MFP 100. History reception portion 215 outputs the received history and apparatus identification information for specifying MFP 100 that transmitted the history, to comparison determination portion 217.

When receiving the history from history reception portion 215, comparison determination portion 217 determines whether to update execution program 71 stored in the MFP that transmitted the history. Specifically, it reads update information 231 stored in HDD 207, and, based on the content of update recorded on update information 231, specifies the function that became a target of updating for each program of a newer version than execution program 71. It then determines whether performance information 73 included in the history has the record that the specified function (corresponding to the updated portion) has been executed before. If performance information 73 records therein that the specified function has been executed before, it is determined to update execution program 71, and the program of the newer version having the specified function updated is determined to be the program (target program) for use in updating execution program 71. It may also be configured to determine to update the execution program on the condition that the performance information records therein that the specified function has been executed with the frequency exceeding a prescribed level, rather than on the condition that the performance information records therein that the specified function has been executed before.

Further, comparison determination portion 217 determines whether to update execution program 71 based on defect occurrence information list 75 included in the history. Specifically, it specifies the function (that suffered a defect) included in the defect occurrence information recorded on defect occurrence information list 75 included in the history. It then determines whether the defect rank and the occurrence frequency included in the defect occurrence information match a predetermined defect condition. In the case they match, if a program having its updated portion corresponding to the specified function (that suffered a defect) is defined in update information 231, it determines to update execution program 71. In this case, the program in which the portion related to the specified function (that suffered a defect) is updated and that is of a newer version than that of execution program 71 included in the history is determined as the target program. Server 200 stores the defect condition table shown in FIG. 10 in HDD 207.

Comparison determination portion 217 refers to the degree of urgency in update information 231 to determine whether to update execution program 71 based on the degree of urgency. Specifically, if the degree of urgency assigned to the program by update information 231 matches a predetermined urgency condition, it is determined to update execution program 71 using the relevant program as the target program. Further, comparison determination portion 217 determines whether to update execution program 71 based on the degree of urgency in update information 231 and performance information 73. Specifically, if the degree of urgency assigned to the program and the number of times of use or the use frequency of the function of the relevant program match an urgency condition, it is determined to update execution program 71 using the relevant program as the target program. Server 200 stores the urgency condition table shown in FIG. 11 in HDD 207.

Comparison determination portion 217, when determining to update execution program 71, outputs the identification information for specifying the program for use in updating execution program 71 to program transmission portion 211. Program transmission portion 211 reads from HDD 207 the program specified by the identification information input from comparison determination portion 217, and transmits the read program to the one of MFPs 100, 100A, 100B, and 100C that transmitted the history.

Figure 20:
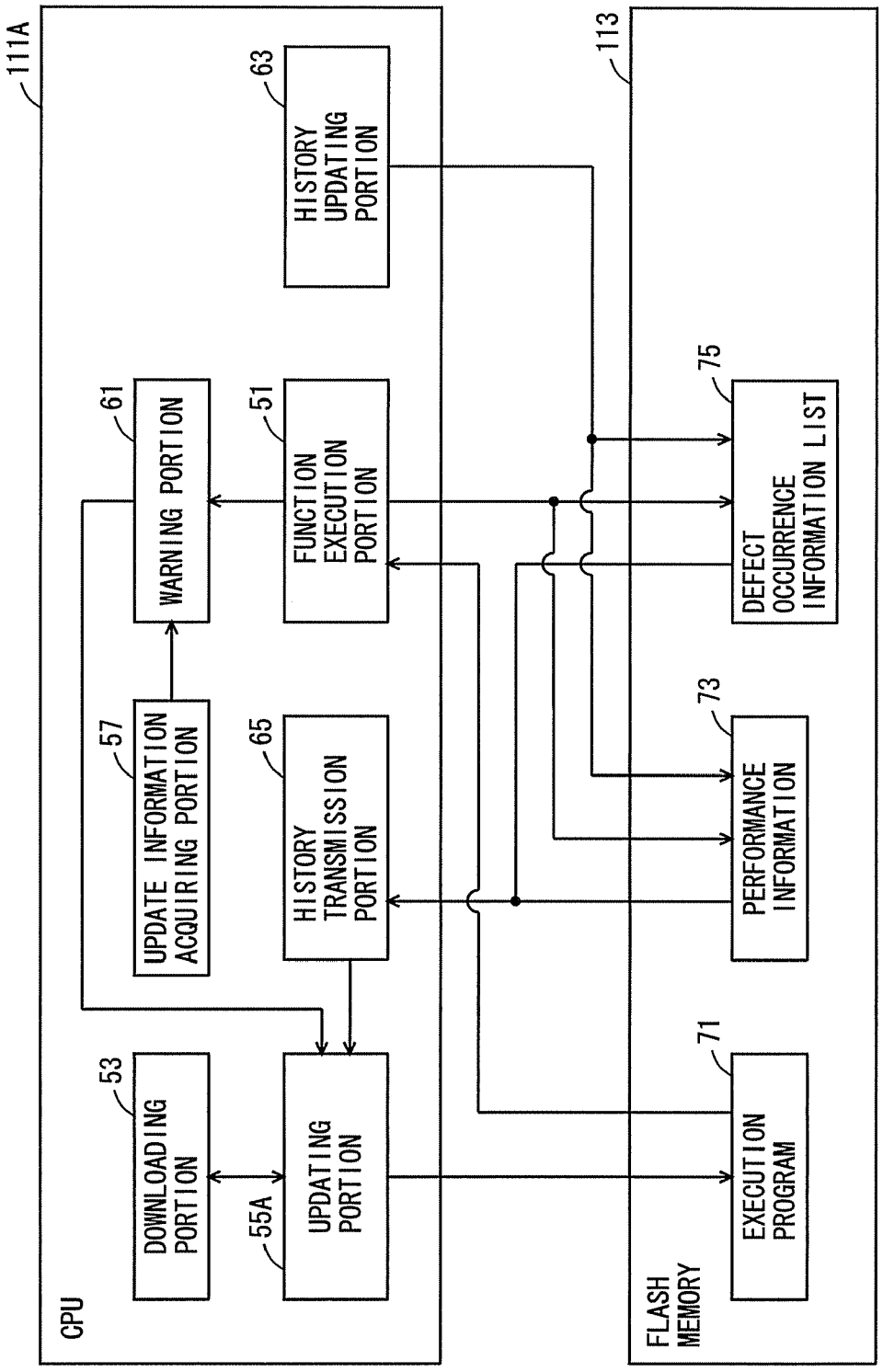
FIG. 20 is a functional block diagram showing an overview of the function of a CPU provided in an MFP in the modification, together with data stored in a flash memory.

FIG. 20 is a functional block diagram showing an overview of the function of a CPU 111A provided in MFP 100 in the modification, together with data stored in flash memory 113. Referring to FIG. 20, the functional block diagram of this modification differs from that in FIG. 7 in that determination portion 59 has been deleted, a history transmission portion 65 has been added, and the updating portion 55A has been modified.

Referring to FIG. 20, history transmission portion 65 transmits to server 200 the history including performance information 73 and defect occurrence information list 75 stored in flash memory 113, and the version of execution program 71. In response to transmission of the history by history transmission portion 65, download portion 53 receives the program transmitted from server 200, and outputs the received program to updating portion 55A. When download portion 53 receives the program, updating portion 55A uses the program to update the execution program stored in flash memory 113.

In the program updating system according to the modification, each of MFPs 100, 100A, 100B, and 100C exerts the effects similar to those described above. Further, server 200 is responsible for determining whether to update execution program 71 stored in each of MFPs 100, 100A, 100B, and 100C, which can reduce the burden of respective MFPs 100, 100A, 100B, and 100C.

While program updating system 1 has been described in the above embodiment, the present invention may of course be understood as a program updating method including the processing shown in FIGS. 12-18, or a program updating program for causing a computer to execute the relevant processing.

Although the present invention has been described and illustrated in detail, it is clearly understood that the same is by way of illustration and example only and is not to be taken by way of limitation, the spirit and scope of the present invention being limited only by the terms of the appended

What is claimed is:

1. An image forming apparatus capable of communicating with a server storing a plurality of kinds of update programs together with update information indicating update conditions for each of a plurality of kinds of functions executed by the image forming apparatus, comprising:
    a program storage memory to store an execution program;
    a function execution portion to execute said stored execution program and execute at least one of the plurality of kinds of functions;
    a performance storage portion, when any of said plurality of kinds of functions is executed by the image forming apparatus, to store performance information regarding execution of the function for each of said plurality of kinds of functions executed by the image forming apparatus so that the performance information stored by the performance storage portion indicates an execution history for each of said plurality of kinds of functions;
    a determination portion to select, based on said performance information and said update information stored in said server, a target program from among said plurality of kinds of update programs stored in said server, wherein the determination portion selects the target program by evaluating the execution history for each of said plurality of kinds of functions having the update conditions indicated in the update information; and
    an updating portion to acquire said selected target program and update said execution program stored in said program storage memory with said acquired target program.

2. The image forming apparatus according to claim 1, wherein said determination portion selects one of said plurality of kinds of update programs in which a portion related to said function included in said performance information is updated as said target program.

3. The image forming apparatus according to claim 1, wherein said performance information includes a frequency of execution of said function, and
    said determination portion selects one of said plurality of kinds of update programs in which a portion related to said function for which said frequency in said performance information is not less than a prescribed value is updated, as said target program.

4. The image forming apparatus according to claim 1, further comprising a warning portion to refer to said update information when an instruction to execute said function is accepted, and output a warning if there is any update program among said plurality of kinds of update programs in which a portion related to said function for which the execution was instructed is updated.

5. The image forming apparatus according to claim 1, wherein said performance information includes defect information associating defect identification information specifying a defect that occurred when said function was executed with the function, and
    said determination portion selects one of said plurality of kinds of update programs in which a portion related to said function associated with said defect identification information included in said defect information is updated, as said target program.

6. The image forming apparatus according to claim 1, wherein said update information includes urgency information indicating a degree of urgency of updating for each of said plurality of kinds of update programs, and
    said determination portion selects one of said plurality of kinds of update programs corresponding to said urgency information indicating a prescribed degree of urgency as said target program, regardless of said performance information.

7. The image forming apparatus according to claim 1, wherein said updating portion updates said execution program stored in said program storage memory with said selected target program at a prescribed timing.

8. The image forming apparatus according to claim 1, further comprising:
- a performance information collection portion to acquire, from another image forming apparatus, performance information regarding an event that said other image forming apparatus has executed any of said plurality of kinds of functions; and
- a performance information updating portion to update said performance information stored in said performance storage portion with said performance information acquired from said other image forming apparatus.

9. The image forming apparatus according to claim 1, wherein said performance information includes information indicating that said function was executed.

10. An image forming apparatus capable of communicating with a server storing a plurality of kinds of update programs together with update information including an updated state of each of a plurality of kinds of functions, comprising:
- a program storage memory to store an execution program;
- a function execution portion to read said stored execution program and execute at least one of the plurality of kinds of functions;
- a performance storage portion, when any of said plurality of kinds of functions is executed by the image forming apparatus, to store performance information regarding execution of the function for each of said plurality of kinds of functions executed by the image forming apparatus so that the performance information stored by the performance storage portion indicates an execution history for each of said plurality of kinds of functions;
- a performance information transmission portion to transmit version information of said execution program stored in said program storage memory and said performance information to said server;
- a reception portion, in response to transmission of said performance information, to receive from said server a target program selected from among said plurality of kinds of update programs stored in said server; and
- an updating portion to update said execution program stored in said program storage memory with said received target program.

11. The image forming apparatus according to claim 10, further comprising:
- an update information reception portion to receive said update information from said server;
- an instruction accepting portion to accept an instruction to execute a function;
- a determination portion to determine, based on said update information, whether a portion in said execution program related to said function specified by said accepted instruction is updated; and
- a warning portion to output a warning when said determination portion determines that said portion is not updated.

12. The image forming apparatus according to claim 10, wherein said updating portion updates said execution program stored in said program storage memory with said received target program at a prescribed timing.

13. The image forming apparatus according to claim 10, further comprising:
- a performance information collection portion to acquire, from another image forming apparatus, performance information regarding an event that said other image forming apparatus has executed any of said plurality of kinds of functions, to acquire performance information regarding execution of said function from said other image forming apparatus; and
- a performance information updating portion to update said performance information stored in said performance storage portion with said performance information acquired from said other image forming apparatus.

14. A program updating system including a server having a memory storing a plurality of kinds of update programs together with update information including an updated state of each of a plurality of kinds of functions, and an image forming apparatus capable of communicating with the server, said image forming apparatus comprising:
- a program storage portion to store an execution program;
- a function execution portion to read said stored execution program and execute at least one of the plurality of kinds of functions;
- a performance storage portion, when any of said plurality of kinds of functions is executed by the image forming apparatus, to store performance information regarding execution of the function for each of said plurality of kinds of functions executed by the image forming apparatus so that the performance information stored by the performance storage portion indicates an execution history for each of said plurality of kinds of functions;
- a performance information transmission portion to transmit version information of said execution program stored in said program storage portion and said performance information to said server;
- a reception portion, in response to transmission of said performance information, to receive from said server a target program selected from among said plurality of kinds of update programs stored in said server; and
- an updating portion to update said execution program stored in said program storage portion with said received target program; and said server comprising:
- a determination portion to determine said target program from among said plurality of kinds of update programs based on said performance information received from said image forming apparatus and said update information; and
- a transmission portion to transmit said determined target program to said image forming apparatus.

15. The program updating system according to claim 14, wherein said determination portion determines one of said plurality of kinds of update programs in which a portion related to said function included in said performance information is updated as said target program.

16. The program updating system according to claim 14, wherein said performance storage portion further stores defect information including identification information specifying a defect that occurred when said function was executed, and
said determination portion determines one of said plurality of kinds of update programs in which a portion related to said function associated with said defect information is updated as said target program.

17. The program updating system according to claim 14, wherein said update information includes urgency information indicating a degree of urgency of updating for each of said plurality of kinds of update programs, and
said determination portion determines one of said plurality of kinds of update programs corresponding to said update information that includes said urgency information indicating a prescribed degree of urgency as said target program, regardless of said performance information.

18. A program updating program stored in a non-transitory computer readable recording medium for an image forming apparatus capable of communicating with a server storing a plurality of kinds of update programs corresponding respectively to a plurality of kinds of functions together with update information indicating update conditions for each of a plurality of kinds of functions, said image forming apparatus including a program storage portion to store an execution program, the program updating program being embodied on a non-transitory computer readable medium for causing said image forming apparatus to execute processing comprising the steps of:

reading said stored execution program and executing at least one of the plurality of kinds of functions;

when any of said plurality of kinds of functions is executed, storing performance information regarding execution of the function so that the performance information stored by the performance storage portion indicates an execution history for each of said plurality of kinds of functions;

selecting, based on said performance information and said update information stored in said server, a target program from among said plurality of kinds of update programs stored in said server, wherein the selection is made by evaluating the execution history for each of said plurality of kinds of functions having update conditions indicated in the update information; and acquiring said determined target program and updating said execution program stored in said program storage portion with said acquired target program.

19. A program updating program stored in a non-transitory computer readable recording medium for an image forming apparatus capable of communicating with a server storing a plurality of kinds of update programs corresponding respectively to a plurality of kinds of functions together with update information, said image forming apparatus including a program storage portion to store an execution program, the program updating program being embodied on a non-transitory computer readable medium for causing said image forming apparatus to execute processing comprising the steps of:

reading said stored execution program and executing at least one of the plurality of kinds of functions;

when any of said plurality of kinds of functions is executed, storing performance information regarding execution of the function so that the performance information stored by the performance storage portion indicates an execution history for each of said plurality of kinds of functions;

transmitting version information of said execution program stored in said program storage portion and said performance information to said server;

in response to transmission of said performance information, receiving from said server a target program selected from among said plurality of kinds of update programs stored in said server; and updating said execution program stored in said program storage portion with said received target program.

20. The image forming apparatus according to claim 1, wherein the determination portion selects the target program by evaluating the execution history only for each of said plurality of kinds of functions having update conditions indicated in the update information stored in the server.

\* \* \* \* \*